US012807526B2

(12) United States Patent
Fotheringham et al.

(10) Patent No.: US 12,807,526 B2
(45) Date of Patent: Nov. 24, 2026

(54) PRESTRESSING A FLAT GLASS BY GENERATING A GRADIENT IN THE SURFACE COMPOSITION

(71) Applicant: Schott AG, Mainz (DE)

(72) Inventors: Ulrich Fotheringham, Wiesbaden (DE); Gerhard Lautenschläger, Jena (DE); Rainer Erwin Eichholz, Frankfurt am Main (DE); Jochen Alkemper, Klein-Winterheim (DE)

(73) Assignee: SCHOTT AG, Mainz (DE)

( * ) Notice: Subject to any disclaimer, the term of this patent is extended or adjusted under 35 U.S.C. 154(b) by 1196 days.

(21) Appl. No.: 17/843,265

(22) Filed: Jun. 17, 2022

(65) Prior Publication Data

US 2022/0411316 A1 Dec. 29, 2022

(30) Foreign Application Priority Data

Jun. 18, 2021 (DE) ..................... 10 2021 115 903.2

(51) Int. Cl.

*C03C 3/091* (2006.01)
*C03B 18/16* (2006.01)
*C03B 18/20* (2006.01)
*C03C 27/04* (2006.01)

(52) U.S. Cl.

CPC .............. *C03C 3/091* (2013.01); *C03B 18/16* (2013.01); *C03B 18/20* (2013.01); *C03C 27/044* (2013.01)

(58) Field of Classification Search

None

See application file for complete search history.

(56) References Cited

U.S. PATENT DOCUMENTS

| | | | |
|---|---|---|---|
| 3,632,322 | A | 1/1972 | Loukes et al. |
| 3,843,346 | A | 10/1974 | Edge et al. |
| 10,442,723 | B2 | 10/2019 | Lautenschlaeger et al. |
| 2016/0176751 | A1 | 6/2016 | Lautenschlaeger et al. |
| 2018/0222790 | A1 | 8/2018 | Fotheringham et al. |
| 2020/0010353 | A1 | 1/2020 | Fotheringham et al. |

FOREIGN PATENT DOCUMENTS

| | | | | |
|---|---|---|---|---|
| DE | 101 50 884 A1 | 5/2003 | | |
| DE | 10 2014 119 594 A1 | 6/2016 | | |
| EP | 1 314 704 A1 | 5/2003 | | |
| EP | 3838859 A1 * | 6/2021 | ............ | C03C 3/091 |

OTHER PUBLICATIONS

Yang et al. ("Cathodoluminescence and depth profiles in tin in float glass," J. Phys. D: Appl. Phys. 27 (1994) 1457-1762.) (Year: 1994).*

European Office Action dated Nov. 8, 2022 for European Patent Application No. 22179158.5 (7 pages).

"Chemical Strengthening of Glass: Lessons Learned and Yet to Be Learned", Arun K. Varshneya, International Journal of Applied Glass Science 1 [2] 131-142, 2010 (12 pages).

"Thermisches Vorspannen von Gläsern niedriger Warmeausdehnung", Werner Kiefer, Glastechnische Berichte 57, No. 9, pp. 221-228, 1984 (8 pages).

"TIE-32: Thermal loads on optical glass", Technical Information, Advanced Optics, Aug. 2004 (7 pages).

"Chemical structure, medium range order, and crystalline reference state of multicomponent oxide liquids and glasses", Reinhard Conradt, in Journal of Non-Crystalline Solids, vols. 345-346, pp. 16-23, Oct. 15, 2004 (8 pages).

"Über den Zustand der unterkühlten Flüssigkeiten und Gläser", Franz Simon, Über Zeitschrift für anorganische und allgemeine Chemie 203, No. 1, pp. 219-227, 1931 (10 pages).

"Technical Glasses, Physical and Technical Properties", Schott, glass made of ideas, Mainz, https://www.us.schott.com/d/epackaging/0ad24277-2ace-4d9a-999d-736ed389f6cc/1.3/18.11.15_final_schott_technical_glasses_us.pdf, 2014 (76 pages).

"Werkstoffe des Bauwesens / Glas", Scriptum zur Vorlesung, Institut für Werkstoffe des Bauwesens, Fakultät für Bauingenieur- und Vermessungswesen, Universität der Bundeswehr München, Frühjahrstrimester 2018, www.unibw.de > lehre > skripte-werkstoffe > glas-2018.pdf (41 pages).

"Strength of Glass and Glass Fibers", Hong Li, Invited presentation, 76th Conference on Glass Problems, SMIC, Alfred University, Am. Ceram. Soc. (Columbus, OH, Nov. 2-5, 2015), https://www.researchgate.net/publication/303099608_Strength_of_Glass_and_Glass_Fibers (14 pages).

"Einführung in die Materialwissenschaft I", H. Föll, Skript zur Vorlesung Christian, Albrechts-Universität Kiel, pp. 79-83 (5 pages).

"Revised Effective lonic Radii and Systematic Studies of Inter-atomic Distances in Halides and Chalcogenides", R.D. Shannon, Acta Cryst. A32, S. 751-767, 1976 (17 pages).

"Direct Calculation of Young's Modulus of Glass", Makishima and Mackenzie, Journal of Non-Crystalline Solids 12, p. 35-45 (11 pages).

"Calculation of Bulk Modulus, Shear Modulus and Poisson's Ratio of Glass", Makishima and Mackenzie, Journal of Non-Crystalline Solids, p. 147-157, 1975 (11 pages).

"Topological constraints and the Makishima-Mackenzie model", Plucinski and Zwanziger, Journal of Non-Crystalline Solids, 429, pp. 20-23, 2015 (4 pages).

"On the glass transition in vitreous silica by differential thermal analysis measurements", R. Bruning, Journal of Non-Crystalline Solids 330, pp. 13-22, 2003 (10 pages).

"Poisson's ratio and modern materials", G.N. Greaves, A.L. Greer, R.S. Lakes and T. Rouxel, Nature Materials 10, p. 823-837, Oct. 24, 2011 (16 pages).

"First-principles ionicity scales", Alberto Garcia and Marvon Cohen, Physical. Review B, vol. 47, No. 8, Feb. 15, 1993 (6 pages).

(Continued)

*Primary Examiner* — David Sample
(74) *Attorney, Agent, or Firm* — TAYLOR & EDELSTEIN, PC

(57) ABSTRACT

The invention relates to glass articles, in particular flat glasses, in the case of which the surface material has gradient material properties as a result of targeted process control which in turn lead to compressive prestressing of the surface. The invention also relates to a method for producing the glass articles and the use thereof.

20 Claims, No Drawings

(56) References Cited

OTHER PUBLICATIONS

"On the Temperature Dependence of Cooperative Relaxation Properties in Glass-Forming Liquids", Gerold Adam and Julian H. Gibbs, The Journal of Chemical Physics vol. 43, No. 1, pp. 139-145, Jul. 1, 1965 (8 pages).
"Thermodynamic aspects of the glass transition in liquids and plastic crystals", C. A. Angell, Pure & Appl. Chem. Vol. 63, No. 10, pp. 1387-1392, 1991 (6 pages).
"Modeling of evaporation processes in glass melting furnaces", Johannes Alphonsius Christianus van Limpt, Dissertation, Eindhoven University of Technology, ISBN: 978-90-386-1147-1, 2007 (277 pages).
"Crystal Structure of Reedmergnerite, a Boron Albite, and Its Relation To Feldspar Crystal Chemisty", D. E. Appleman and J.R. Clark, The American Mineralogist, vol. 50, 1827-1850, 1965 (24 pages).
"Crystal structure of KBSi3O8 isostructural with danburite", Mitsuyoshi Kimata, Mineralogical Magazine vol. 57, pp. 157-164, 1993 (8 pages).
"The coordination numbers of Na and K atoms in low albite and microcline as determined from a procrystal electron-density distribution", Robert T. Downs et al., American Mineralogist, vol. 81, pp. 1344-1349, 1996 (6 pages).
"Immiscibility in silicate melts", J.W. Greig, American Journal of Science, 5th Ser., vol. 13, 1-44 and 133-154, 1927, (67 pages).
"Determination of the absorptivity of OH in a sodium borosilicate glass", A. David Pearson, G.A. Pasteur, & W.R. Northover, Journal of Materials Science 14, 869-872, 1979 (5 pages).
German Office Action dated Mar. 10, 2022 for German Patent Application No. 10 2021 115 903.2 (7 pages).

* cited by examiner

PRESTRESSING A FLAT GLASS BY GENERATING A GRADIENT IN THE SURFACE COMPOSITION

CROSS REFERENCE TO RELATED APPLICATIONS

This application claims priority to German Patent Application No. 10 2021 115 903.2, filed Jun. 18, 2021, which is incorporated herein by reference.

BACKGROUND OF THE INVENTION

1. Field of the Invention

The present invention relates to glass articles, for example, flat glasses, in the case of which the surface material has gradient material properties as a result of targeted process control which in turn lead to compressive prestressing of the surface. The invention also relates to a method for producing the glass articles as well as the use thereof.

2. Description of the Related Art

Glasses which are compressively prestressed on the surface are required for many applications, in particular for applications in the field of safety glass or generally for glasses which are more resistant to mechanical effects than unprestressed glasses. There are various methods of compressive prestressing of the surfaces of glass products.

In the case of what is known as chemical prestressing, see i.a. Arun K. Varshneya, Chemical Strengthening of Glass: Lessons Learned and Yet To Be Learned, International Journal of Applied Glass Science 1 [2]131-142 (2010), smaller ions located in the glass surface, e.g. sodium ions, are replaced by larger ions, e.g. potassium ions. This results in a greater space requirement of the surface relative to the core material. As a result of the connection to the core material, the surface is prevented from undergoing this expansion and is compressed to the original dimension, which results in corresponding compressive stresses. The chemical prestressing process typically takes place at high temperatures, but still significantly below the annealing point.

In the case of what is known as thermal prestressing, see i.a. Werner Kiefer, Thermisches Vorspannen von Glasern niedriger Warmeausdehnung, Glastechnische Berichte 57 (1984), No. 9, pp. 221-228, the glass product, for example, a flat glass, is heated to a temperature of, for example, 100K above the annealing point and then cooled in a shock-like manner by blowing or the like. A compressive prestress on the surface (thermal prestressing) is produced by the interaction of locally different cooling (rapidly on the surface, slowly in the core due to the low thermal conductivity of glass), the resultant locally different thermal expansion, the in turn stress build-up as a result and the relaxation of stress which follows this build-up of stress and is highly temperature-dependent.

According to Technical Information Exchange No. 32 (TIE-32), Thermal loads on optical glass, Schott A G, Mainz, Germany, October 2018, surface compressive stress a of a thermally prestressed glass sheet is $$\sigma = f \cdot \frac{\Delta T \cdot CTE \cdot E}{1-\mu} \quad (1)$$

E is the modulus of elasticity, μ the Poisson's ratio and ΔT the difference between the surface temperature and the core temperature of the sheet at the moment when the core temperature passes through the annealing point during shock cooling. CTE is the coefficient of thermal expansion of the glass. "f" is a factor which reflects the relationship between the difference between surface temperature and average sheet temperature to the difference between surface temperature and core temperature. "f" is in any case smaller than "1"; in the event that, until the glass transition range is passed through, a "steady state" with a parabola-shaped temperature profile has formed, f=⅔.

The following applies to ΔT according to Kiefer, loc. cit.:

$$\Delta T = \frac{h \cdot d}{4 \cdot \kappa + h \cdot d} \cdot (T_G - T_{ambient}) \quad (2)$$

Here, h is the heat transfer coefficient between the sheet and the cooling medium, for example, blower air, d the sheet thickness, k the thermal conductivity of the glass and $T_{ambient}$ the temperature of the cooling medium or the ambient temperature.

$T_G$ is a discretisation of the glass transition range in the sense that stresses relax above $T_G$ and no longer below $T_G$. To be more precise, this temperature is dependent on the cooling speed. The most suitable estimated value independent of the cooling speed is the annealing point. In the literature, the glass transformation temperature is often also used at this point, which means no large error since the annealing point and glass transformation temperature barely differ.

Both processes, i.e. thermal and chemical prestressing, can be used both for sheets and other glass articles; the stated considerations always apply in the event that the thickness of a respectively considered piece of such a glass article is small in relation to its lateral dimensions. This is particularly the case with sheets. Both processes nevertheless require an additional method step which involves reheating of the glass and significant chemical or technical engineering outlay.

What is needed in the art is a method with which glass products can be compressively prestressed on the surface by a modification of the production method quasi "inline".

SUMMARY OF THE INVENTION

The invention in one form is directed to a glass article, including: three portions comprising an upper side surface glass, a core glass, and an underside surface glass, the upper side surface glass and the underside surface glass being present in each case to a depth of <20 nm and the core glass is present in any event at 500 nm depth, a sum of proportions of tin oxide and bismuth oxide in the underside surface glass is greater than a sum of proportions of tin oxide and bismuth oxide in the upper side surface glass, the core glass having a $CTE_K$ calculated according to the following formulas (13) and (14) in a range from 2.5 to 5.0 ppm/K:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}}, \quad (13)$$

$$CTE_{Glass} = \left( \frac{50116.33042\left(\frac{\text{kJ}}{\text{Mol}}\right)}{\overline{E_{pot}}} - 26.1724514 \right) \text{ppm/K} \quad (14)$$

-continued $$CTE_K = \left( \frac{50116.33042\left(\frac{\text{kJ}}{\text{Mol}}\right)}{\overline{E_{pot}}} - 26.1724514 \right) \text{ppm/K}$$

$$CTE_O = \left( \frac{50116.33042\left(\frac{\text{kJ}}{\text{Mol}}\right)}{\overline{E_{pot}}} - 26.1724514 \right) \text{ppm/K},$$

wherein m is a number of cation types which occur, $E_{pot,j}$ is a potential well depth tabulated for a $j^{th}$ cation type, and $z_{j,I}$ is a number of cations of the $j^{th}$ type in an $i^{th}$ constituent phase;

the upper side surface glass having a $CTE_O$ calculated according to the formula (14) and the following formulas (15) and (16) which is lower by at least 0.6 ppm/K in comparison with the $CTE_K$ of the core glass calculated according to the previous formulas:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}} = \frac{\sum_{j=1}^{m} \left( \sum_{i=1}^{n} c_i \cdot z_{i,j} \right) \cdot E_{pot,j}}{\sum_{j=1}^{m} \left( \sum_{i=1}^{n} c_i \cdot z_{i,j} \right)}, \qquad (15)$$

$$\sum_{i=1}^{n} c_i \cdot z_{i,j} = k_j \cdot x_j; \qquad (16)$$

and wherein according to the following formula (10) a compressive prestress $\sigma_O$ on the upper side surface of at least 50 MPa is produced if the values of the core glass calculated according to the following formulas (31), (29), and (37) are used for $E/(1-\mu)$ and $T_G$ and a difference $CTE_K$-$CTE_O$ between the CTE values calculated for core glass and upper side surface glass is used for $\Delta CTE$:

$$\sigma_O = \frac{E}{1-\mu} \cdot (T_G - T_{ambient}) \cdot \Delta CTE, \qquad (10)$$

$$\mu = 0.17 + \Delta\mu_f + \Delta\mu_\chi, \qquad (29)$$

$$E = \left( 0.683888667 \left( 2 \cdot (1+\mu) \cdot f \cdot \frac{\overline{E_{pot}} \cdot z}{V_{mol}} \right) - 39.4242404 \right) GPa, \qquad (31)$$

$$\frac{1}{VA - T_G} = (0.002665819 \cdot f_W + 0.001119212) \cdot \frac{1}{K}, \qquad (37)$$

wherein $T_G$ is an annealing point of the glass, VA is a working point of the glass, E is a modulus of elasticity of the glass, $\mu$ is Poisson's ratio of the glass, $T_{ambient}$ is an ambient temperature, $$\Delta\mu_f = -\left[ \frac{(1+\mu)(1-2\mu)}{3} \frac{1}{f} \right] \Delta f, \text{ and}$$

$$\text{Angle condition number } p.A. - \left( \frac{2}{3} \right)$$

$$f = \frac{(3D \text{ angle degrees of freedom number } p.A. - \text{angle degrees of freedom number } p.A.)}{\text{Angle condition number } p.A.}.$$

As used herein, the $CTE_{Glass}$ value in formula (14) refers generally to the coefficient of thermal expansion for glass calculated according to formula (14). $CTE_K$, as used herein, refers to the coefficient of thermal expansion of core glass calculated according to formula (14), i.e., the $CTE_{Glass}$ of core glass. $CTE_O$, as used herein, refers to the coefficient of thermal expansion of upper side surface glass calculated according to formula (14), i.e., the $CTE_{Glass}$ of upper side surface glass. The term $CTE_{Glass}$ is thus a general term for the coefficient of thermal expansion of glass, regardless of location, while $CTE_K$ and $CTE_O$ are the coefficient of thermal expansion values of glass at specific locations. The formulae for calculating $CTE_K$ and $CTE_O$ are thus also generally referred to herein as formula (14), as indicated previously, but may also be specifically referred to as formula (14a) for $CTE_K$ and formula (14b) for $CTE_O$. Further, the core glass can have a composition which is characterized by a system of constituent phases which comprises the constituent phase reedmergnerite in a proportion of 10 to 50 mol %, the constituent phase potassium reedmergnerite in a proportion of 0 to 30 mol %, the constituent phase anorthite in a proportion of 0 to 20 mol %, the constituent phase diboron trioxide in a proportion of 0 to 20 mol %, and the constituent phase silicon dioxide in a proportion of 20 to 75 mol %.

Further, the composition of the core glass can be characterized by the following constituent phases:

| Constituent phase | Min (mol %) | Max (mol %) |
|---|---|---|
| Reedmergnerite | 10 | 50 |
| Potassium reedmergnerite | 0 | 30 |
| Cordierite | 0 | 20 |
| Anorthite | 0 | 20 |
| Diopside | 0 | 20 |
| Diboron trioxide | 0 | 20 |
| Silicon dioxide | 20 | 75. |

Further, the composition of the core glass is characterized by the following constituent phases:

| Constituent phase | Min (mol %) | Max (mol %) |
|---|---|---|
| Reedmergnerite | 10 | 50 |
| Potassium reedmergnerite | 0 | 30 |
| Albite | 0 | 50 |
| Anorthite | 0 | 20 |
| Diboron trioxide | 0 | 20 |
| Silicon dioxide | 20 | 75. |

Further, a ratio of a proportion of the constituent phase silicon dioxide in the upper side surface glass to a proportion of the constituent phase silicon dioxide in the core glass can lie in a range from 1.1:1 to 2.0:1. Further, a proportion of the constituent phase silicon dioxide in the upper side surface glass can be at least 50 mol %. Further, a proportion of the constituent phase anorthite in the upper side surface glass can be at most 5 mol %. Further, a proportion of the constituent phase reedmergnerite in the upper side surface glass can be at most 10 mol %. Further, a working point $VA_K$ calculated according to the following formula (35) from the composition of the core glass in constituent phases can lie in a range from 1200° C. to 1350° C.:

$$VA = 0.989573825 \cdot \overline{E_{pot}} \cdot \frac{°\text{C}}{kj/\text{mol}} - 387.9923613\ °\text{C}. \qquad (35)$$

Further, a quotient of the elastic modulus and the variable $(1-\mu)$ calculated according to the formulas (31) and (29) from the composition of the core glass can lie in a range from 80 GPa to 100 GPa. Further, the $CTE_O$ calculated according to the formulas (14), (15), and (16) of the upper side surface glass Can be 1.2 to 3.0 ppm/K. Further, a thickness of the glass article can lie in a range from 0.1 mm to 30 mm.

The invention in another form is directed to a method for producing a glass article, the method including: melting glass raw materials; forming a glass article from the glass melt; and cooling the glass article; wherein the glass article comprises three portions comprising an upper side surface glass, a core glass, and an underside surface glass, the upper side surface glass and the underside surface glass being present in each case to a depth of <20 nm and the core glass is present in any event at 500 nm depth, a sum of proportions of tin oxide and bismuth oxide in the underside surface glass is greater than a sum of proportions of tin oxide and bismuth oxide in the upper side surface glass, the core glass having a $CTE_K$ calculated according to the following formulas (13) and (14) in a range from 2.5 to 5.0 ppm/K:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}}, \tag{13}$$

$$CTE_{Glass} = \left( \frac{50116.33042\left(\frac{kJ}{Mol}\right)}{\overline{E_{pot}}} - 26.1724514 \right) ppm/K \tag{14}$$

$$CTE_K = \left( \frac{50116.33042\left(\frac{kJ}{Mol}\right)}{\overline{E_{pot}}} - 26.1724514 \right) ppm/K$$

$$CTE_O = \left( \frac{50116.33042\left(\frac{kJ}{Mol}\right)}{\overline{E_{pot}}} - 26.1724514 \right) ppm/K,$$

wherein m is a number of cation types which occur, $E_{pot,j}$, is a potential well depth tabulated for a $j^{th}$ cation type, and $z_{j,I}$ is a number of cations of the $j^{th}$ type in an $i^{th}$ constituent phase; the upper side surface glass having a $CTE_O$ calculated according to the formula (14) and the following formulas (15) and (16) which is lower by at least 0.6 ppm/K in comparison with the $CTE_K$ of the core glass calculated according to the formulas (13) and (14):

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}} = \frac{\sum_{j=1}^{m} \left( \sum_{i=1}^{n} c_i \cdot z_{i,j} \right) \cdot E_{pot,j}}{\sum_{j=1}^{m} \left( \sum_{i=1}^{n} c_i \cdot z_{i,j} \right)}, \tag{15}$$

$$\sum_{i=1}^{n} c_i \cdot z_{i,j} = k_j \cdot x_j; \tag{16}$$

and wherein according to the following formula (10) a compressive prestress $\sigma_O$ on the upper side surface of at least 50 MPa is produced if the values of the core glass calculated according to the following formulas (31), (29), and (37) are used for $E/(1-\mu)$ and $T_G$ and a difference $CTE_K - CTE_O$ between the CTE values calculated for core glass and upper side surface glass is used for $\Delta CTE$:

$$\sigma_O = \frac{E}{1-\mu} \cdot (T_G - T_{ambient}) \cdot \Delta CTE, \tag{10}$$

$$\mu = 0.17 + \Delta\mu_f + \Delta\mu_\chi, \tag{29}$$

-continued $$E = \left( 0.683888667\left( 2 \cdot (1+\mu) \cdot f \cdot \frac{\overline{E_{pot}} \cdot z}{V_{mol}} \right) - 39.4242404 \right) GPa, \tag{31}$$

$$\frac{1}{VA - T_G} = (0.002665819 \cdot f_W + 0.001119212) \cdot \frac{1}{K}, \tag{37}$$

wherein $T_G$ is an annealing point of the glass, VA is a working point of the glass, E is a modulus of elasticity of the glass, μ is Poisson's ratio of the glass, $T_{ambient}$ is an ambient temperature, $$\Delta\mu_f = -\left[ \frac{(1+\mu)(1-2\mu)}{3} \frac{1}{f} \right] \Delta f, \text{ and}$$

$$f = \frac{\text{Angle condition number } p.A. - \left(\frac{2}{3}\right) (3D \text{ angle degrees of freedom number } p.A. - \text{angle degrees of freedom number } p.A.)}{\text{Angle condition number } p.A.}.$$

Further, the glass melt can contain 30 to 60 mmol water per liter glass in a dissolved form. Further, the method can include flat glass forming by a float method in which the glass melt is added onto a surface of a float bath composed of molten metal by flowing onto the surface of the float bath. Further, a dwell time which the glass has in a forming region of the float bath at a viscosity in the range $10^3$ dPas to $10^8$ dPas can lie in a range from 5 to 60 minutes. Further, the dwell time can lie in a range from 1 minute to 10 minutes per mm thickness of the glass article. Further, a glass temperature in a portion of the flowing-on glass can lie in a range from $VA_K$+10° C. to $VA_K$+140° C., wherein $VA_K$ is a working point of the glass calculated from a composition of the glass. Further, the float bath can be operated in a reducing protective gas atmosphere. Further, a float bath pressure can lie between 0.05 mbar and 0.3 mbar and/or a hydrogen content in the gas atmosphere lies between 2 vol % and 15 vol-%.

DETAILED DESCRIPTION OF THE INVENTION

One possible alternative to the two methods described above from the prior art is produced if one succeeds during production to change the composition in a surface layer such that a lower CTE is produced there than in the interior. Precisely this is achieved with the present invention in contrast to the two methods mentioned above. This does not exclude a glass article according to the invention from being optionally also chemically or thermally prestressed in an additional step after production. However, in contrast to this, the invention is directed at compressive prestressing on the surface which can be achieved by the CTE differences introduced during production between surface and core.

Assuming that, firstly, in the case of a cooling process down to annealing point $T_G$ all of the stresses originating from different thermal expansions fully relax, but no longer at lower temperatures and that, secondly, the thickness of the surface layer is small in comparison with the thickness of the piece of glass under consideration, it follows from Hooke's law for two-dimensional stress states for the compressive prestressing at the surface:

$$\sigma_O = \frac{(T_G - T_{ambient}) \cdot \Delta CTE \cdot E}{1-\mu} \tag{3}$$

Here, ΔCTE is the difference between the coefficients of thermal expansion in core $CTE_K$ and on surface $CTE_O$.

According to the invention, the term "surface" refers to a proportion of the glass which is close to the glass/air boundary. The glass which forms the surface is referred to here as "surface glass"; the remaining glass which lies further to the inside is referred to here as "bulk glass" or "core glass". A precise delimitation between surface and bulk is difficult, therefore it is defined for this invention that the surface glass is present to a depth of <20 nm. The surface analysis of the composition can be performed in particular via Cs-TOF-SIMS at 1000 eV. In each case the average of the measurements close to the surface to a depth<20 nm is used as the surface value and the composition in constituent phases is determined with the aid of the inverse matrix from the oxide composition.

Three or more individual measurements from approx. 5 nm depth to <20 nm depth are optionally performed. The individual measurements are optionally equidistant. For example, individual measurements can be performed at a depth of 6 nm, 9 nm, 12 nm, 15 nm and 18 nm or individual measurements can be performed at a depth of 5 nm, 7.5 nm, 10 nm, 12.5 nm, 15 nm and 17.5 nm. The precise depth of the individual measurements is not decisive here. The properties of the surface glass are determined computationally on the basis of the formulae explained herein on the basis of the thus determined composition of the surface glass.

The composition of the core glass can be determined with a conventional chemical analysis of the glass composition since the glass composition does not experience any change at greater depth as a result of production. Core glass is present in any event at a 500 nm depth. The surface can be advantageously influenced by specific measures during glass production.

The TOF-SIMS measurement values are optionally standardized with the aid of the values from the chemical analysis of the core glass. In particular, the results of the TOF-SIMS can be continued in the direction of the surface (same signal strength means same mass flow). A concentration in % and precisely that which corresponds to the concentration from the chemical analysis of the glass is therefore optionally assigned to a specific TOF-SIMS signal strength of the core glass (for example, determined at a depth of 500 nm, 600 nm or 700 nm or averaged). These values are continued towards the surface, i.e. therefore if a signal strength of x has been produced which corresponds to a concentration of 20%, and x is also measured at the surface, the surface concentration is initially also set as equal to 20%. If the value 2x is measured at the surface instead of the value x, the surface concentration is set as equal to 40%. The surface concentrations determined in this manner are subsequently standardized so that their sum is 100%.

The present invention provides a targeted combination of a production method and suitable glasses. The core of the production method is a change in the surface composition in comparison with the core composition by targeted removal of individual components. As a result of this, glass articles are obtained which include a surface glass with a changed composition in comparison with the core glass such that the coefficient of thermal expansion on the surface and in the core differs.

The suitable glasses in turn are themselves described below as a combination of stoichiometric glasses, i.e. glasses which exist in the same stoichiometry also as crystals and the properties of which, due to the identical topology of the assemblies, as tested in the literature on the basis of many examples by NMR measurements or the like, can be assumed to be very similar in each case for glass and crystal. Such stoichiometric glasses, the mixture of which makes it possible to achieve properties according to the present invention, are selected for this. In this application, these stoichiometric glasses are also referred to as "base glasses" or "constituent phases".

It is not a new concept to describe glasses on the basis of the constituent phases assigned to them. Conclusions as to the chemical structure of a glass can be drawn by indicating the base glasses (cf. Conradt R: "Chemical structure, medium range order, and crystalline reference state of multicomponent oxide liquids and glasses", in Journal of Non-Crystalline Solids, Volumes 345-346, 15 Oct. 2004, Pages 16-23).

One basic principle of this concept is that one can describe the combination of various base glasses to form a glass as a good approximation, as Conradt, loc. cit., states, to an ideal mixture and can therefore assume that the properties of the mixture can be described as a linear superposition of the properties of the base glasses. This is not the case with the description by simple oxides; a wide range of reactions occur between these during mixing together, e.g. the acid-base reaction if components such as Na2O (anhydride of sodium hydroxide) und SiO2 (anhydride of silicic acid) meet. A mixture of simple oxides can therefore in no way be considered to be ideal as a good approximation. In the case of a mixture of "finished" base glasses, in the case of which in particular the acid-base reaction has already taken place, this is in contrast the case.

The present invention relates to a glass article, in particular a borosilicate glass article, including three portions (forming a transition into one another):

an upper side surface glass, a core glass, and an underside surface glass,

- wherein the upper side surface glass and the underside surface glass are present in each case to a depth of <20 nm and the core glass is in any event present at 500 nm depth,
- wherein the sum of the proportions of tin oxide and bismuth oxide in the underside surface glass is greater than the sum of the proportions of tin oxide and bismuth oxide in the upper side surface glass,
- wherein the core glass has a $CTE_K$ calculated according to the formulae (13, 14) in a range from 2.5 to 5.0 ppm/K,
- wherein the upper side surface glass has a $CTE_O$ calculated according to the formulae (14, 15, 16) which is lower by at least 0.6 ppm/K in comparison with the $CTE_K$ of the core glass calculated according to the formulae (13, 14), and
- wherein according to formula (10) a compressive prestress $\sigma_O$ is produced on the upper side surface of at least 50 MPa if the values of the core glass calculated according to the formulae (31), (29) and (37) are used for $E/(1-\mu)$ and $T_G$ and the difference $CTE_K-CTE_O$ of the CTE values calculated for core glass and upper side surface glass is used for ΔCTE.

The glass article according to the invention includes three portions (which form a transition into one another), namely an upper side surface glass, a core glass and an underside surface glass. The three portions are an integral component of one glass article. The separation into three portions is not supposed to mean that the glass article represents a laminate or a comparable multilayer composite, in the case of which three different glass articles are laminated together to form a new glass article or otherwise be connected to one another in a positive-locking manner. The glass article according to the invention does not involve such a laminate or the like although the glass article can naturally also be used as part of a laminate. The differentiation of three portions within one glass article rather results from the fact that, in particular in terms of the production method of the glass article, changes to the glass composition on its surface can be brought about, with the aid of which advantageous technical effects can be achieved, in particular a desired compressive prestressing on the upper side surface.

The glass article can be, for example, a flat glass, in particular, a glass sheet. The dimensions of the glass articles can be described in particular as a length, width and thickness. A flat glass is in particular a glass article, the width and length of which are significantly larger than its thickness.

The thickness of the glass article according to the invention can lie, for example, in a range from 0.1 to 30 mm, in particular from 0.2 to 25 mm, from 0.5 to 20 mm, from 1.0 to 15 mm, from 1.5 to 12 mm, from 2.0 to 10 mm, from 3.0 to 9.0 mm, or from 4.0 to 8.0 mm. The thickness of the glass article can be, for example, at least 0.1 mm, at least 0.2 mm, at least 0.5 mm, at least 1.0 mm, at least 1.5 mm, at least 2.0 mm, at least 3.0 mm, or at least 4.0 mm. The thickness of the glass article can be, for example, at most 30 mm, at most 25 mm, at most 20 mm, at most 15 mm, at most 12 mm, at most 10 mm, at most 9.0 mm, or at most 8.0 mm.

The width of the glass article can lie, for example, in a range from 1 to 1000 cm, in particular in a range from 2 to 500 cm, from 5 to 200 cm, from 10 to 150 cm, from 20 to 100 cm, or from 40 to 60 cm. The width of the glass articles can be, for example, at least 1 cm, at least 2 cm, at least 5 cm, at least 10 cm, at least 20 cm, or at least 40 cm. The width of the glass article can be, for example, at most 1000 cm, at most 500 cm, at most 200 cm, at most 150 cm, at most 100 cm, or at most 60 cm.

The length of the glass article can lie, for example, in a range from 1 to 1000 cm, in particular in a range from 2 to 500 cm, from 5 to 200 cm, from 10 to 150 cm, from 20 to 100 cm, or from 50 to 70 cm. The length of the glass article can be, for example, at least 1 cm, at least 2 cm, at least 5 cm, at least 10 cm, at least 20 cm, or at least 50 cm. The length of the glass article can be, for example, at most 1000 cm, at most 500 cm, at most 200 cm, at most 150 cm, at most 100 cm, or at most 70 cm.

According to formula (10), a compressive prestress $\sigma_O$ on the upper side surface is optionally produced of at least 50 MPa, at least 60 MPa, at least 70 MPa, at least 80 MPa, at least 90 MPa, at least 100 MPa, at least 105 MPa, or at least 110 MPa if the values of the core glass calculated according to the formulae (31), (29) and (37) are used for $E/(1-\mu)$ and $T_G$ and the difference $CTE_K-CTE_O$ of the CTE values calculated for core glass and upper side surface glass is used for $\Delta CTE$. In some embodiments, according to formula (10), a compressive prestress $\sigma_O$ on the upper side surface is produced of at most 250 MPa, at most 225 MPa, at most 200 MPa, at most 175 MPa, at most 150 MPa, at most 140 MPa, at most 130 MPa, or at most 120 MPa, if the values of the core glass calculated according to the formulae (31), (29) and (37) are used for $E/(1-\mu)$ und $T_G$ and the difference $CTE_K-CTE_O$ of the CTE values calculated for core glass and upper side surface glass is used for $\Delta CTE$. In some embodiments, according to formula (10), a compressive prestress $\sigma_O$ on the upper side surface is produced of 50 to 250 MPa, of 60 to 225 MPa, of 70 to 200 MPa, of 80 to 175 MPa, of 90 to 150 MPa, of 100 to 140 MPa, of 105 to 130 MPa, or of 110 to 120 MPa, if the values of the core glass calculated according to the formulae (31), (29) and (37) are used for $E/(1-\mu)$ and $T_G$ and the difference $CTE_K-CTE_O$ of the CTE values calculated for core glass and upper side surface glass is used for $\Delta CTE$.

The expressions "upper side" and "underside" are not intended to be understood such that, when using the glass article, the upper side is necessarily arranged at the top as seen spatially and the underside correspondingly at the bottom. On the contrary, the terms only serve to clearly differentiate between the two sides of the glass article and the corresponding surface glasses. According to the invention, for example, the terms "first side" and "second side" can also be used instead of "upper side" and "underside". In embodiments in which the glass article is produced using the float method, the terms "upper side" and "underside" indicate the orientation during floating. The underside faces the float bath and the upper side faces away from the float bath. The term "core glass" refers, however, to the composition of the core of the glass article, the composition of which was not changed by the production method in contrast to the composition of the upper side surface glass and the underside surface glass.

The core glass optionally has a composition which is characterized by a system of constituent phases which includes the constituent phase reedmergnerite in a proportion of 10 to 50 mol %, the constituent phase potassium reedmergnerite in a proportion of 0 to 30 mol %, the constituent phase anorthite in a proportion of 0 to 15 mol %, the constituent phase diboron trioxide in a proportion of 0 to 20 mol %, and the constituent phase silicon dioxide in a proportion of 20 to 75 mol %.

Core glass which is characterized by a system of constituent phases which includes the constituent phase reedmergnerite in a proportion of 10 to 50 mol %, the constituent phase potassium reedmergnerite in a proportion of 0 to 30 mol %, the constituent phase anorthite in a proportion of 0 to 20 mol %, the constituent phase diboron trioxide in a proportion of 0 to 20 mol %, and the constituent phase silicon dioxide in a proportion of 20 to 75 mol % is particularly well suited to obtaining the desired compressive prestressing via a difference between the $CTE_K$ of the core glass and the $CTE_O$ of the upper side surface glass.

A core glass with a composition which is characterized by the following phases which constitute the core glass is particularly suitable:

| Constituent phase | Min (mol %) | Max (mol %) |
|---|---|---|
| Reedmergnerite | 10 | 50 |
| Potassium reedmergnerite | 0 | 30 |
| Cordierite | 0 | 20 |
| Anorthite | 0 | 20 |
| Diopside | 0 | 20 |
| Diboron trioxide | 0 | 20 |
| Silicon dioxide | 20 | 75 |

A core glass with a composition which is characterized by the following phases which constitute the core glass is likewise optional:

| Constituent phase | Min (mol %) | Max (mol %) |
|---|---|---|
| Reedmergnerite | 10 | 50 |
| Potassium reedmergnerite | 0 | 30 |
| Albite | 0 | 50 |
| Anorthite | 0 | 20 |

-continued

| Constituent phase | Min (mol %) | Max (mol %) |
|---|---|---|
| Diboron trioxide | 0 | 20 |
| Silicon dioxide | 20 | 75 |

The glasses according to the invention should furthermore optionally satisfy further conditions which are related in terms of formula with the composition from constituent phases, which relationships are highlighted further below.

We will first indicate conversion matrices for the conversion of the composition details of constituent phases into simple oxides.

Conversion of the Composition of Constituent Phases into Composition of Simple Oxides and Vice Versa The composition in constituent phases of one of the optional glasses is indicated in the following standardized form for the purpose of conversion:

TABLE 1

| Constituent phase | Formula (standardized to a simple oxide) |
|---|---|
| Reedmergnerite | $(Na_2O \cdot B_2O_3 \cdot 6SiO_2)/8$ |
| Potassium reedmergnerite | $(K_2O \cdot B_2O_3 \cdot 6SiO_2)/8$ |
| Cordierite | $(2MgO \cdot 2Al_2O_3 \cdot 5SiO_2)/9$ |
| Anorthite | $(CaO \cdot Al_2O_3 \cdot 2SiO_2)/4$ |
| Diopside | $(MgO \cdot CaO \cdot 2SiO_2)/4$ |
| Diboron trioxide | $B_2O_3$ |
| Silicon dioxide | $SiO_2$ |

The conversion of these compositions into a composition indication in mol-% in relation to the following simple oxides . . .

| # | Oxide |
|---|---|
| 1. | $SiO_2$ |
| 2. | $B_2O_3$ |
| 3. | $Al_2O_3$ |
| 4. | $MgO$ |
| 5. | $CaO$ |
| 6. | $Na_2O$ |
| 7. | $K_2O$ |

is performed with the aid of the matrix indicated here. In this case, the composition indication in mol-% in relation to the base glasses is multiplied as a column vector from the right with the matrix:

| Matrix | | | | | | | | |
|---|---|---|---|---|---|---|---|---|
| 6/8 | 6/8 | 5/9 | 2/4 | 2/4 | 0 | 1 | x | $(Na_2O \cdot B_2O_3 \cdot 6SiO_2)/8$ |
| 1/8 | 1/8 | 0 | 0 | 0 | 1 | 0 | | $(K_2O \cdot B_2O_3 \cdot 6SiO_2)/8$ |
| 0 | 0 | 2/9 | 1/4 | 0 | 0 | 0 | | $(2MgO \cdot 2Al_2O_3 \cdot 5SiO_2)/9$ |
| 0 | 0 | 2/9 | 0 | 1/4 | 0 | 0 | | $(CaO \cdot Al_2O_3 \cdot 2SiO_2)/4$ |
| 0 | 0 | 0 | 1/4 | 1/4 | 0 | 0 | | $(MgO \cdot CaO \cdot 2SiO_2)/4$ |
| 1/8 | 0 | 0 | 0 | 0 | 0 | 0 | | $B_2O_3$ |
| 0 | 1/8 | 0 | 0 | 0 | 0 | 0 | | $SiO_2$ |

As a result of the multiplication of the column vector with the matrix, one obtains the composition of the glass in mole percent. Vice versa, a composition in mole percent can easily be transformed via the respective inverse matrix into a base glass composition. Of course, only those base glass compositions which do not provide any negative values for the base glasses upon conversion are regarded as according to the invention.

The composition in constituent phases of a further optional glass is indicated in the following standardized form for the purpose of conversion:

TABLE 2

| Constituent phase | Formula (standardized to a simple oxide) |
|---|---|
| Reedmergnerite | $(Na_2O \cdot B_2O_3 \cdot 6SiO_2)/8$ |
| Potassium reedmergnerite | $(K_2O \cdot B_2O_3 \cdot 6SiO_2)/8$ |
| Albite | $(Na_2O \cdot Al_2O_3 \cdot 6SiO_2)/8$ |
| Anorthite | $(CaO \cdot Al_2O_3 \cdot 2SiO_2)/4$ |
| Diboron trioxide | $B_2O_3$ |
| Silicon dioxide | $SiO_2$ |

The conversion of these compositions into a composition indication in mol-% in relation to the following simple oxides . . .

| # | Oxide |
|---|---|
| 1. | $SiO_2$ |
| 2. | $B_2O_3$ |
| 3. | $Al_2O_3$ |
| 4. | $CaO$ |
| 5. | $Na_2O$ |
| 6. | $K_2O$ |

is performed with the aid of the matrix indicated here. In this case, the composition indication in mol-% in relation to the base glasses is multiplied as a column vector from the right with the matrix:

| Matrix | | | | | |
|---|---|---|---|---|---|
| 6/8 | 6/8 | 6/8 | 2/4 | 0 | 1 |
| 1/8 | 1/8 | 0 | 0 | 1 | 0 |
| 0 | 0 | 1/8 | 1/4 | 0 | 0 |
| 0 | 0 | 0 | 1/4 | 0 | 0 |
| 1/8 | 0 | 1/8 | 0 | 0 | 0 |
| 0 | 1/8 | 0 | 0 | 0 | 0 |
| x | $(Na_2O \cdot B_2O_3 \cdot 6SiO_2)/8$ | | | | |
| | $(K_2O \cdot B_2O_3 \cdot 6SiO_2)/8$ | | | | |
| | $(Na_2O \cdot Al_2O_3 \cdot 6SiO_2)/8$ | | | | |
| | $(CaO \cdot Al_2O_3 \cdot 2SiO_2)/4$ | | | | |
| | $B_2O_3$ | | | | |
| | $SiO_2$ | | | | |

As a result of the multiplication of the column vector with the matrix, one obtains the composition of the glass in mole percent. Vice versa, a composition in mole percent can be easily transferred into a base glass composition via the respective inverse matrix. Of course, only those base glass compositions which do not provide any negative values for the base glasses upon conversion are regarded as according to the invention.

The further conditions which the glasses according to the invention should satisfy and which are partially related in terms of formula with the composition of constituent phases, in particular specific surface properties, are explained below.

In order to be able to precisely describe these surface properties, the derivation of the equations (3) including the assumptions made there must first be reported.

In the derivation of (3), it is firstly assumed that, during a cooling process down to the annealing point, all stresses relax instantaneously and from the annealing point do not relax any more, corresponding to the approximation of Franz Simon, Uber den Zustand der unterkühlten Flüssigkeiten und Gläser, Zeitschrift für anorganische und allgemeine Chemie 203, No. 1 (1931), pp. 219-227. A relative distortion $(T_G - T_{ambient}) \cdot \Delta CTE$ of the surface and core material then results from the difference between the coefficient of expansion at the surface and in the core at room temperature, referred to here as $T_{ambient}$. A temperature of 25° C. is assumed as room temperature $T_{ambient}$. In equilibrium, a compressive prestress $\sigma_O$ prevails in the surface and a tensile prestress $\sigma_K$ prevails in the core, which due to the equilibrium condition $$0 = \int_0^a \sigma(z) dZ \tag{4}$$

must satisfy the relationship $$0 = \sigma_O \cdot d_O + \sigma_K \cdot \left(\frac{a}{2} - d_O\right) \tag{5}$$

Here, the integral in (4) goes in the normal direction across sheet thickness a, $d_O$ is the thickness of the surface layer.

In the case of a planar stress state, the following applies to the relationship between distortion ε and stress σ:

$$\sigma = -\varepsilon \cdot \frac{E}{1-\mu} \tag{6}$$

so that the following applies:

$$0 = \varepsilon_O \cdot d_O + \varepsilon_K \cdot \left(\frac{a}{2} - d_O\right) \tag{7}$$

wherein $\varepsilon_O$ is the distortion at the surface and Ex is the distortion in the core.

As stated above, the relationship:

$$\varepsilon_O - \varepsilon_K = -(T_G - T_{ambient}) \cdot \Delta CTE \tag{8}$$

applies to the relative distortion of surface and core, i.e. $\varepsilon_O - \varepsilon_K$. If we now still assume that the surface layer with changed CTE is very much thinner than the core of the glass, we can ignore Ex and write:

$$\varepsilon_O \approx -(T_G - T_{ambient}) \cdot \Delta CTE \tag{9}$$

or $$\sigma_O = \frac{E}{1-\mu} \cdot (T_G - T_{ambient}) \cdot \Delta CTE \tag{10}$$

Once this is ignored, it is irrelevant whether the prestressing is symmetrical in relation to the central plane of the glass article or an asymmetrical stress profile is present.

In the transition from (9) to (10), it is assumed approximately that modulus of elasticity E and Poisson's ratio μ are only dependent on the composition to a weak and in this case negligible extent, whereas the CTE is highly dependent on the composition. This assumption is in conformity with the properties of normal technical glasses, see Schott, Technical Glasses, Physical and Technical Properties, Mainz, 2014.

Equation (10) and all subsequent considerations also apply by design to the case that the described phenomenon is restricted to one side of the glass article.

Equation (10) can be immediately generalised to the case that the CTE close to the surface has a profile which is dependent on depth z. The prerequisite is only that the thickness of the surface layer in which the CTE is different from the value in the core region is small in comparison with the total thickness of the sheet. One then obtains:

$$\sigma(z) = \frac{E}{1-\mu} \cdot (T_G - T_{ambient}) \cdot (CTE_K - CTE(z)) \tag{11}$$

According to the invention, glass articles, in particular sheets, in the case of which, close to the surface, either a step-shaped or a continuous stress profile is formed by way of a variation of the CTE with depth z, with a tensile stress zone in the core of the glass product and a compression stress (profile) zone at the surface.

If one inserts into (10) the typical values for technical glasses E=72 GPa, μ=0.2, $T_G$=575° C. and sets $T_{ambient}$=25° C., one obtains:

$$\sigma_o = 49500\ GPa \cdot K \cdot \Delta CTE \tag{12}$$

A ΔCTE of 0.5 ppm/K thus leads to $\sigma_O \approx 25$ MPa, a ΔCTE of 1 ppm/K to $\sigma_O \approx 50$ MPa etc.

This value, i.e. 50 MPa, lies in the order of magnitude which is measured as compressive prestress directly at the surface of what is known as a partially prestressed glass (i.e. of a glass with a compressive prestress of 40 to 60 MPa) (see B. Weller, S. Tasche, Glasbau; in: Wendehorst Bautechnische Zahlentafeln, Ed.: O. W. Wetzell, $32^{nd}$ Edition, 2007; cited from K.-Ch. Thienel, Scriptum zur Vorlesung "Werkstoffe des Bauwesens/Glas", Institut für Werkstoffe des Bauwesens, Fakultat für Bauingenieur- und Vermessungswesen, Universitat der Bundeswehr München, Fruhjahrstrimester 2018).

Compressive prestress values of this order of magnitude are provided by the present invention. Compressive prestresses increase strength, among other things, by compressing cracks, the depth of which lies in the order of magnitude of the thickness of the compressive stress zone. With a compressive prestress zone with a thickness in the double-digit nanometre range, for example, cracks of depth 1 nm to 10 nm typical of freshly drawn glass can be compressed, with a compressive prestress zone of a thickness in the three-digit nanometre range cracks of depth 100 nm typical for freshly drawn and then heat-treated (e.g. for stress relaxation) glass, see R. E. Mould, The Strength of Inorganic Glasses, in: Fundamental Phenomena in the Materials Sciences, Publisher L. J. Bonis, J. J. Duga and J. J. Gilman, 119-149 (1967), cited by Hong Li, Strength of Glass and Glass Fiber, Invited presentation, 76th Conference on Glass Problems, GMIC, Alfred University, Am. Ceram. Soc. (Columbus, OH, Nov. 2-5, 2015).

Cracks of the stated orders of magnitude should in particular not be ignored if one succeeds in performing the handling of components according to the invention such as in particular sheets so that no deeper (in the literal sense) damage to the glass occurs.

According to the invention are accordingly glass articles, in particular with the described composition in the core, for which the difference $CTE_K$–$CTE_O$ is at least 0.6 ppm/K, optionally at least 0.8 ppm/K, optionally at least 1 ppm/K, optionally at least 1.2 ppm/K, optionally at least 1.4 ppm/K, optionally at least 1.6 ppm/K.

This difference is determined from the compositions in the regions of core and surface from which the respective coefficients of expansion follow and the combination of composition and production method from which in turn the difference between the compositions of core and surface results.

Since the coefficient of thermal expansion can be calculated in a very good approximation via the average bond strength from the composition, the values calculated in this manner are used here. $CTE_K$ and $CTE_O$ are calculated from the composition in the core glass or surface glass according to formulae (13, 14, 15, 16). The formulae (13, 14) are used for the calculation of $CTE_K$. $CTE_O$ can be calculated with the formulae (13, 14) or with the formulae (14, 15, 16), is optionally, however, calculated with the formulae (14, 15, 16). The reason for this is that, in terms of the production method, such a change in the composition of the surface glass can arise that its composition can no longer be described with a phase system according to the invention, in particular if negative phase proportions should arise for one or more phases so that the phase-independent formulae (14, 15, 16) are better suited for the calculation of the $CTE_O$.

Typical values have been used in the above sample calculations for the quotient from the elastic module and the variable (1−μ).

According to the invention, glass articles, in particular with the described composition in the core, for which the quotient from the elastic module and the variable (1−μ) is at least 80 GPa are optional.

Since the modulus of elasticity can be calculated in a very good approximation via the average bond strength from the composition and the Poisson's ratio can likewise be calculated in a very good approximation from the packing density and the cross-linking numbers, the values calculated in this manner are used below (formulae (29) and (27)).

The quotient from the modulus of elasticity and the variable (1−μ) calculated with the aid of the formulae (31) and (29) from the composition of the core glass optionally lies in a range from 80 GPa to 100 GPa, in particular from 85 GPa to 95 GPa. The quotient from the modulus of elasticity and the variable (1−μ) calculated with the aid of the formulae (31) and (29) from the composition of the core glass is, for example, at least 80 GPa or at least 85 GPa. The quotient from the modulus of elasticity and the variable (1−μ) calculated with the aid of the formulae (31) and (29) from the composition of the core glass is optionally at most 100 GPa, in particular at most 95 GPa.

According to the invention, glass articles, in particular with the described composition in the core, for which the $T_G$ is at least 570° C. are furthermore optional.

Since, however, annealing point $T_G$ can be calculated in a very good approximation via the average bond strength and the number of degrees of angular freedom per atom from the composition, the values calculated in this manner are used here (formulae (35) and (33)).

The $T_G$ calculated with the aid of the formula (37) from the composition of the core glass optionally lies in a range from 570° C. to 630° C., in particular from 580° C. to 620° C. The $T_G$ calculated with the aid of the formula (37) from the composition of the core glass is, for example, at least 570° C. or at least 580° C. The $T_G$ calculated with the aid of the formula (37) from the composition of the core glass is, for example, at most 630° C. or at most 620° C.

Working point $VA_K$ calculated according to formula (35) from the composition of the core glass in constituent phases optionally lies in a range from 1200° C. to 1350° C., optionally from 1250° C. to 1300° C. Working point $VA_K$ calculated according to formula (35) from the composition of the core glass in constituent phases is optionally at least 1200° C. or at least 1250° C. Working point $VA_K$ calculated according to formula (35) from the composition of the core glass in constituent phases is optionally at most 1350° C. or at most 1300° C.

The compressive prestress calculated according to formula (10) on surface $\sigma_O$ for floated glasses with an atmosphere-side upper side and a tin bath-side underside optionally lies on the upper side at at least 50 MPa and on the underside at at least 25 MPa. The compressive prestress calculated according to formula (10) on surface $\sigma_O$ in particular for floated glasses with an atmosphere-side upper side and a tin bath-side underside optionally lies on the upper side at at least 60 MPa, at least 70 MPa, at least 80 MPa, at least 90 MPa, at least 100 MPa, at least 105 MPa, or at least 110 MPa if the values of the core glass calculated according to the formulae (31), (29) and (37) are used for E/(1−μ) and $T_G$ and difference $CTE_K$–$CTE_O$ between the CTE values calculated for core glass and upper side surface glass is used for ΔCTE. In some embodiments, the compressive prestress calculated according to formula (10) on surface $\sigma_O$ in particular for floated glasses with an atmosphere-side upper side and a tin bath-side underside lies on the upper side at at most 250 MPa, at most 225 MPa, at most 200 MPa, at most 175 MPa, at most 150 MPa, at most 140 MPa, at most 130 MPa, or at most 120 MPa if the values of the core glass calculated according to the formulae (31), (29) and (37) are used for E/(1−μ) and $T_G$ and difference $CTE_K$–$CTE_O$ between the CTE values calculated for core glass and upper side surface glass is used for ΔCTE. In some embodiments, the compressive prestress calculated according to formula (10) on surface $\sigma_O$ in particular for floated glasses with an atmosphere-side upper side and a tin bath-side underside lies on the upper side in a range from 50 to 250 MPa, from 60 to 225 MPa, from 70 to 200 MPa, from 80 to 175 MPa, from 90 to 150 MPa, from 100 to 140 MPa, from 105 to 130 MPa, or from 110 to 120 MPa if the values of the core glass calculated according to the formulae (31), (29) and (37) are used for E/(1−μ) and $T_G$ and difference $CTE_K$–$CTE_O$ between the CTE values calculated for core glass and upper side surface glass is used for ΔCTE.

Coefficient of Thermal Expansion Below the Glass Transition Range

It is known from the literature that the coefficient of thermal expansion e.g. for metals is reversely proportional to the bond energy (or to the "depth of the interatomic potential wells"), see e.g. H. Föll, Skript zur Vorlesung "Einführung in die Materialwissenschaft I", Christian Al-brechts-Universität Kiel, pp. 79-83.

In a simple image of oxidic glasses, the cations are placed in in each case a potential well formed by the surrounding oxygen atoms and assumes as its depth the sum of the bond strengths of the various simple bonds to the surrounding oxygen atoms, therefore concentrates the entire interaction energy in potential wells with the cations in the centre and the oxygen atoms in the periphery. It is thus no longer necessary to consider the reverse case; it would also be more difficult to analyse since an oxygen atom can be located between several cations of different types, which cannot arise in reverse in purely oxidic glasses. These values are tabulated, e.g. in DE 10 2014 119 594 A1:

TABLE 3

| Cation | Potential well depth/(kj/mol) |
|---|---|
| Si | 1864 |
| B | 1572.5 |
| Al | 1537 |
| Mg | 999 |
| Ca | 1063 |
| Na | 440.5 |
| K | 395 |

An average potential well depth can be calculated from the composition of a glass from the constituent phases indicated above, the numbers of different cations contained in the respective phases and the potential well depths tabulated above per cation:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}} \tag{13}$$

Here, m is the number of cation types which occur, $E_{pot,j}$, is the potential well depth tabulated for the $j^{th}$ cation type above and $z_{j,i}$ is the number of the cations of the $j^{th}$ type in the $i^{th}$ constituent phase. The sums relating to j are tabulated below:

TABLE 4

| "z sums" and "z-$E_{pot}$ sums" | | | |
|---|---|---|---|
| Constituent phase | Formula (standardized to a simple oxide) | $\sum_{j=1}^{m} z_{i,j}$ ("z sum") | $\sum_{j=1}^{m} z_{i,j} \cdot E_{pot,j}$/(kJ/mol) ("z-$E_{pot}$ sum") |
| Reedmergnerite | $(Na_2O \cdot B_2O_3 \cdot 6SiO_2)/8$ | 1.25 | 1901.25 |
| Potassium reedmergnerite | $(K_2O \cdot B_2O_3 \cdot 6SiO_2)/8$ | 1.25 | 1889.875 |
| Albite | $(Na_2O \cdot Al_2O_3 \cdot 6SiO_2)/8$ | 1.25 | 1881 |
| Cordierite | $(2MgO \cdot 2Al_2O_3 \cdot 5SiO_2)/9$ | 1.222 | 1940.666667 |
| Anorthite | $(CaO \cdot Al_2O_3 \cdot 2SiO_2)/4$ | 1.25 | 1966.25 |
| Diopside | $(MgO \cdot CaO \cdot 2SiO_2)/4$ | 1 | 1447.5 |
| Boron oxide | $B_2O_3$ | 2 | 3145 |
| Silicon dioxide | $SiO_2$ | 1 | 1864.00 |

This average bond strength depends, as e.g. also in the case of metals, see H. Föll, loc. cit., reversely proportionally to the coefficient of thermal expansion. An evaluation of a series of silicate glasses of different types (soda-lime glasses, borosilicate glasses, aluminosilicate glasses) leads to the following formula:

$$CTE_{Glass} = \left( \frac{50116.33042\left(\frac{\text{kJ}}{\text{Mol}}\right)}{\overline{E_{pot}}} - 26.1724514 \right) \text{ppm/K} \tag{14}$$

$$CTE_K = \left( \frac{50116.33042\left(\frac{\text{kJ}}{\text{Mol}}\right)}{\overline{E_{pot}}} - 26.1724514 \right) \text{ppm/K}$$

-continued $$CTE_o = \left( \frac{50116.33042\left(\frac{\text{kJ}}{\text{Mol}}\right)}{\overline{E_{pot}}} - 26.1724514 \right) \text{ppm/K}$$

The average $CTE_{Glass}$ can thus be precisely predicted to 0.3 ppm/K.

Since only the properties of the oxides are included in this calculation of the $CTE_{Glass}$, one can also calculate $CTE_{Glass}$ directly from the composition indicated in simple oxides. For this purpose, (13) is changed to:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}} = \frac{\sum_{j=1}^{m} \left(\sum_{i=1}^{n} c_i \cdot z_{i,j}\right) \cdot E_{pot,j}}{\sum_{j=1}^{m} \left(\sum_{i=1}^{n} c_i \cdot z_{i,j}\right)} \tag{15}$$

and $\Sigma c_i \cdot z_{i,j}$ is identified with the product from molar concentration $k^j$ of the simple oxide which contains the $j^{th}$ cation and number $x_j$ of the cations in this simple oxide:

$$\sum_{i=1}^{n} c_i \cdot z_{i,j} = k_f \cdot x_f \tag{16}$$

Since the capacity to achieve the desired CTE difference between core and surface depends on the $CTE_K$ of the core, certain values are optional in this regard. The $CTE_K$ of the core glass calculated according to the formulae (13, 14) is optionally 2.5 to 5.0 ppm/K, further optionally 3.0 to 4.5 ppm/K. The $CTE_K$ of the core glass calculated according to formulae (13, 14) is optionally at least 2.5 ppm/K, further optionally at least 3.0 ppm/K. The $CTE_K$ of the core glass calculated according to formulae (13, 14) is optionally at most 5.0 ppm/K, further optionally at most 4.5 ppm/K.

The $CTE_O$ of the upper side surface glass calculated according to the formulae (14, 15, 16) is optionally 1.2 to 3.0 ppm/K, further optionally 1.5 to 2.5 ppm/K. The $CTE_O$ of the upper side surface glass calculated according to formulae (14, 15, 16) is optionally at least 1.2 ppm/K, further optionally at least 1.5 ppm/K. The $CTE_O$ calculated according to formulae (14, 15, 16) is optionally at most 3.0 ppm/K, further optionally at most 2.5 ppm/K.

The surface glass optionally has a $CTE_O$ calculated according to formulae (14, 15, 16) which is lower than the $CTE_K$ of the core glass calculated according to formulae (13, 14) by at least 0.6 ppm/K, further optionally at least 0.8 ppm/K, particularly optionally at least 1.0 ppm/K, further optionally at least 1.2 ppm/K, further optionally at least 1.4 ppm/K, further optionally at least 1.6 ppm/K, further optionally at least 1.8 ppm/K, further optionally at least 2.0 ppm/K. $\Delta CTE = CTE_K - CTE_O$ optionally lies in a range from 0.6 ppm/K to 3.6 ppm/K, for example, 0.8 ppm/K to 3.4 ppm/K, 1.0 ppm/K to 3.2 ppm/K, 1.2 ppm/K to 3.0 ppm/K, 1.4 ppm/K to 2.8 ppm/K, 1.6 ppm/K to 2.6 ppm/K, 1.8 to 2.4 ppm/K, or 2.0 to 2.2 ppm/K. $\Delta CTE = CTE_K - CTE_O$ can be, for example, at most 3.6 ppm/K, at most 3.4 ppm/K, at most 3.2 ppm/K, at most 3.0 ppm/K, at most 2.8 ppm/K, at most 2.6 ppm/K, at most 2.4 ppm/K, or at most 2.2 ppm/K.

Density, Molar Volume and Packing Density

Knowledge of the density, molar volume and packing density are necessary to calculate the modulus of elasticity.

Remarkably, density ρ can very easily be calculated by lever rule from molar masses $M_i$ and densities $\rho_i$ of the constituent phases:

$$\rho = \frac{\sum_{i=1}^{n} c_i \cdot M_i}{\sum_{i=1}^{n} c_i \cdot \frac{M_i}{\rho_i}} \quad (17)$$

The numerator of (17) is in this case the molar mass, the denominator is molar volume $V_{mol}$ of the glass. The density for the glass systems addressed here can thus on average be forecast precisely to 1%.

The density values are found in O. V. Mazurin, M. V. Streltsina, T. P. Shvaiko-Shvaikovskaya, Handbook of Glass Data A-C, Elsevier, Amsterdam, 1983-1987.

From the molar volume, we also calculate packing density $\chi$ of the glass as an intermediate variable for further calculations. For this purpose, we firstly calculate the (molar) ion volume for each constituent phase. This refers to the volume which one mole of the constituent phase (to be precise: one mole of the constituent phase standardized to a simple oxide) occupies if one regards them as spherical ions with the "crystal radius" of Robert Shannon, see Robert D. Shannon, Revised Effective Ionic Radii and Systematic Studies of Interatomic Distances in Halides and Chalcogenides, Acta Cryst. A32 (1976), S. 751-767. These radii differ from one another depending on the coordination number. For the cations, the coordination numbers required for this purpose have been inferred from the mineralogical literature listed below in the discussion of the constituent phases; according to Conradt R., loc. cit., we assume that the coordination numbers of the cations in the glass are equal to those of the corresponding crystal phases. The oxygen atoms are assigned to the cations in accordance with the value, i.e. half an oxygen ion is allotted to a sodium ion, etc. It is then assumed for the individual oxygen ion that it is coordinated in accordance with this assignment, i.e. an oxygen ion assigned to a silicon ion is coordinated twice etc. If no explicit radius values are present for individual coordination numbers in the table from Robert D. Shannon, loc. cit., interpolation or extrapolation is performed.

The molar ion volumes arising from this are tabulated below together with the molar masses and density values.

TABLE 5

Molar masses, densities and molar ion volumes of the standardized constituent phases

| Constituent phase | Formula (standardized to a simple oxide) | $M_i$/g | $\rho_i$/ (g/cm$^3$) | Ion volume $V_{ion,i}$/cm$^3$ |
|---|---|---|---|---|
| Reedmergnerite | $(Na_2O \bullet B_2O_3 \bullet 6SiO_2)/8$ | 61.513 | 2.445 | 10.18044415 |
| Potassium reedmergnerite | $(K_2O \bullet B_2O_3 \bullet 6SiO_2)/8$ | 65.540 | 2.417 | 12.17972854 |
| Albite | $(Na_2O \bullet Al_2O_3 \bullet 6SiO_2)/8$ | 65.555 | 2.368 | 10.2644898 |
| Cordierite | $(2MgO \bullet 2Al_2O_3 \bullet 5SiO_2)/9$ | 64.994 | 2.635 | 9.754984882 |
| Anorthite | $(CaO \bullet Al_2O_3 \bullet 2SiO_2)/4$ | 69.552 | 2.694 | 10.55580119 |
| Diopside | $(MgO \bullet CaO \bullet 2SiO_2)/4$ | 54.137 | 2.847 | 8.797510051 |
| Boric oxide | $B_2O_3$ | 69.619 | 1.82 | 13.4254877 |
| Silicon dioxide | $SiO_2$ | 60.084 | 2.203 | 9.100438178 |

The packing density is thus produced by:

$$\chi = \frac{\sum_{i=1}^{n} c_i \cdot V_{ion,i}}{\sum_{i=1}^{n} c_i \cdot \frac{M_i}{\rho_i}} \quad (18)$$

Modulus of Elasticity

The starting point for the calculation of the modulus of elasticity is the theory of Makishima and Mackenzie, see "Direct calculation of Young's modulus of glass", "Calculation of bulk modulus, shear modulus and Poisson's ratio of glass", J. Non-Crystall. Sol., 1973 and 1975. According to this theory, the modulus of elasticity can be represented by:

$$E \propto \chi \cdot \sum_{i=1}^{n} e_{Diss,i} \cdot c_i \quad (19)$$

Here, $e_{diss.,i}$ is the dissociation energy density of the $i^{th}$ component (dimension e.g. kJ/cm$^3$) and $c_i$ is its molar proportion. $\chi$ is the packing density.

For further calculations, this is rewritten to:

$$E \propto \chi \cdot \frac{1}{V_{mol}} \cdot \sum_{i=1}^{n} E_{Diss,i} \cdot c_i \quad (20)$$

Makishima and Mackenzie understand dissociation energy to be the same as the above-mentioned bond strength. Above, we have assigned the latter to the cations such that we, if we are referring to simple oxides in the case of the components, can identify the averaged molar dissociation energy with the above-mentioned average potential well depth of a cation, multiplied with number z of the cations per mole:

$$\sum_{i=1}^{n} E_{Diss,i} \cdot c_i = \sum_{i=1}^{n} c_i \cdot z_i \cdot E_{pot,i} = \overline{E_{pot}} \cdot \sum_{i=1}^{n} c_i \cdot z_i = \overline{E_{pot}} \cdot z \quad (21)$$

Thus:

$$E \propto \chi \cdot \frac{\overline{E_{pot}} \cdot z}{V_{mol}} \quad (22)$$

With the above-mentioned theory, one obtains very good results for glasses in which no boroxol rings arise; the adhoc extension made by Makishima and Mackenzie for borates is unsatisfactory.

A new theory from Plucinski and Zwanziger ("Topological constraints and the Makishima-Mackenzie model", J. Non-Crystall. Sol., 2015), supplements the expression characterization by a topological prefactor, but, in the published form, is only suitable for purely covalently bonded glasses (chalcogenides).

A modified topological prefactor is therefore defined in the present case.

The essence of topological considerations, as explained in detail, for example, in DE 10 2014 119 594 A1, is to count the constraints placed on the atoms as a result of the bond to the neighboring atoms. These constraints relate partially to interatomic distance ("distance conditions"), on the other hand to the bond angle ("angle conditions"). If an atom has r neighbors (r=coordination number), distance conditions to be assigned to this atom follow from the r distance conditions to these neighbors r/2 if the distance conditions are distributed equally between the two bond partners. Further 2r−3 angle conditions which are to be assigned to this atom follow on from the bond angles between these neighbors, with the angle under consideration at the tip of the respective angle.

DE 10 2014 119 594 A1 describes a method which, during the calculation of the distance and angle conditions, provides a weighting of all conditions with the individual bond strength and yet again an additional weighting of the angle conditions (only those originating from the oxygen-cation-oxygen angles; the conditions belonging to the cation-oxygen-cation angles are ignored) with the degree of covalency of the respective bond. The weighting factors are standardized in that the silicon-oxygen bond is separated in each case by the individual bond strength or the degree of covalency of the silicon-oxygen bond so that a number of (rounded) 1.333333333 (i.e. 4/3) distance conditions and (rounded) 1.666666667 (i.e. 5/3) angle conditions per atom is produced for quartz glass. This corresponds, as explained in DE 10 2014 119 594 A1, to the direct analysis of the topology of quartz glass if one simply counts all the distance and angle conditions and ignores the angle conditions of the silicon-oxygen-silicon angle.

Quartz glass thus has a number of "3" constraints per atom, which corresponds precisely to the number of degrees of freedom per atom. Quartz glass should therefore not have any (or in reality: a very small) number of degrees of freedom of configuration per atom, which corresponds to the small cp jump of quartz glass during the glass transition measured by difference calorimetry, see R. Bruning, "On the glass transition in vitreous silica by differential thermal analysis measurements", Journal of Non-Crystalline Solids 330 (2003) 13-22.

Lower values for the numbers of distance and angle conditions per atom than (rounded) 1.333333333 (4/3) or 1.666666667 (5/3) are generally produced for other oxidic glasses. It is still, however, possible to differentiate in the case of the angle conditions whether the associated angle conditions relate to angles which all lie in a plane (trigonal coordination) or not (tetrahedral or higher coordination). The latter are referred to here as 3D angle conditions.

"4/3 minus distance condition number" is therefore referred to as distance degree of freedom number, "5/3 minus angle condition number" is referred to as angle degree of freedom number and "5/3 minus 3D angle condition number" is referred to as 3D angle degree of freedom number, in each case per atom (abbreviation: "p.A.").

The following consideration still applies. The model approach of Makishima-Mackenzie sums and averages over isotropic interactions. In the region of the boroxol rings, however, the interaction is not isotropic, rather a "force-free" sliding is possible in the plane of the boroxol rings.

In order to take account of this, it is taken into consideration that modulus of elasticity E is composed of a shear and a compression/dilation proportion. This is expressed by the following equations, see e.g. H. Föll, Skript zur Vorlesung "Einführung in die Materialwissenschaft I", Christian Albrechts-Universitat Kiel, pp. 79-83:

$$\frac{1}{R} = \frac{1}{3G} + \frac{1}{9K} \tag{23a}$$

$$G = \frac{E}{2(1+\mu)} \tag{23b}$$

$$K = \frac{E}{3(1-2\mu)} \tag{23c}$$

$$K = G\frac{2(1+\mu)}{3(1-2\mu)} \tag{23d}$$

Here, G is the shear modulus, K the compression modulus and μ the Poisson's ratio. E can according to (23a) be calculated optionally from one of the pairs of variables G and K, G and μ as well as K and μ.

The theory of Makashima and Mackenzie is now modified in so far as the above-mentioned proportionality between modulus and dissociation energy density is not set for modulus of elasticity E, but rather for shear modulus G:

$$G \propto \frac{\overline{E_{pot}} \cdot z}{V_{mol}} \tag{40}$$

No further proportionality to the packing density is set for the shear modulus at this point; the relationship to the packing density indicated in the case of Makashima and Mackenzie and also here is introduced further below.

The fact that the presence of the boroxol rings leads to a reduction in the shear modulus due to the above-mentioned sliding planes is taken into consideration by a prefactor f which is defined as a ratio between numbers. The first number is the angle condition number p.A. reduced by (2/3) of the difference between 3D angle degrees of freedom number p.A. and angle degrees of freedom number p.A. The second number is the angle condition number p.A. If no boroxol rings are present, this prefactor is one; if boroxol rings are present, this prefactor is smaller than one.

$$G \propto f \cdot \frac{\overline{E_{pot}} \cdot z}{V_{mol}}, \tag{25}$$

$$f = \frac{\text{Angle condition number } p.A. - \left(\frac{2}{2}\right)(3D \text{ angle degrees of freedom number } p.A. - \text{angle degrees of freedom number } p.A.)}{\text{Angle condition number } p.A.}$$

The number (2/3) is produced from the following consideration relating to shearing. It is assumed that the boroxol rings are distributed such that (1/3) lie in a plane which is covered by the shear angle, and (2/3) in the planes perpendicular thereto. Only the latter two contribute to a reduction in the shear modulus. Only (2/3) of those degrees of angle freedom which additionally arise are correspondingly also counted if one does not count all the angle conditions, rather only the 3D angle conditions.

In contrast to the shear modulus, no significant change is to be expected in the case of the compression modulus as a result of the presence of the sliding planes. For reasons of consistency, this has a consequence for Poisson's ratio μ. (23d) is considered for this purpose. If G is changed by the introduction of sliding planes and K is not supposed to change due to otherwise unchanged conditions, this can and must be compensated for by a change $\Delta\mu_f$ to μ. In order to quantify this change in a first approximation, K is developed in first order after f and μ; it is then still required that ΔK=0:

$$\Delta K = \frac{2(1+\mu)}{3(1-2\mu)}\frac{\partial G}{\partial f}\Delta f + G\left(\partial\frac{2(1+\mu)}{3(1-2\mu)}/\partial\mu\right)\Delta\mu = \frac{2(1+\mu)}{3(1-2\mu)}\frac{G}{f}\Delta f + G\left(\frac{2}{(1-2\mu)^2}\right)\Delta\mu_f \overset{!}{=} 0 \tag{26}$$

It follow from this:

$$\Delta\mu_f = -\left[\frac{(1+\mu)(1-2\mu)}{3}\frac{1}{f}\right]\Delta f \tag{27}$$

Since the glasses according to the invention are silicate glasses, quartz glass is selected as the starting point for the development. For quartz glass, μ=0.17 and f=1, these values correspondingly being inserted into the square bracket expression. This expression thus assumes the value 0.2574. In order to obtain $\Delta\mu_f$ for a different silicate glass, −0.2574 is multiplied with Δf=f−1; f is the value which is produced from (25) for this different glass.

When changing from quartz glass to a different silicate glass, yet another circumstance should be taken into account in relation to μ. Other silicate glasses have similar, but different packing densities, but there is a positive correlation between μ and the packing density, see Greaves, G., Greer, A., Lakes, R., Rouxel, T, Poisson's ratio and modern materials, Nature Mater 10, 823-837 (2011). This is taken into account by a second Δμ term which is referred to as $\Delta\mu_\chi$. For the glasses according to the invention, this can be assumed to be linear, so that the following applies:

$$\frac{\Delta\mu_\chi}{\mu} = \frac{\Delta_\chi}{\chi} \tag{28}$$

Quartz glass is once again taken as a starting point, for which χ=0.33367062. Ax is then determined from the value to be calculated according to (18) for χ and 0.33367062 according to Δχ=χ−0.33367062. In the left-hand denominator, μ=0.17 and in the right-hand denominator χ=0.33367062. We thus calculate Ξ for a glass according to the invention by:

$$\mu = 0.17 + \Delta\mu_f + \Delta\mu_\chi \tag{29}$$

The approach for E is thus and with (23b):

$$E = a\cdot 2\cdot(1+\mu)\cdot f\cdot\frac{\overline{E_{pot}}\cdot z}{V_{mol}} + b \tag{30}$$

“a” and “b” are adjustable parameters. The evaluation of a series of different silicate glasses of different types (soda-lime glasses, borosilicate glasses, aluminosilicate glasses) leads to the following formula:

$$E = \left(0.683888667\left(2\cdot(1+\mu)\cdot f\cdot\frac{\overline{E_{pot}}\cdot z}{V_{mol}}\right) - 39.4242404\right) GPa \tag{47}$$

In this case, $\overline{E_{pot}}$ in kJ/Mol, z dimensionless (mole cations per mole glass) and $V_{mol}$ in $cm^3$ are to be inserted. $\overline{E_{pot}}$ is to be determined in each case according to formula (13) and Table (4). $V_{mol}$ is the denominator in equation (18). f is determined from the angle conditions according to formula (25) and Table (6). Ap follows according to equation (29) from $\Delta\mu^f$ and Δμχ. $\Delta\mu_f$ follows according to equation (27) from f. $\Delta\mu_\chi$ is determined with equation (28); the necessary input is packing density χ which itself is determined according to equation (18). A mean error of 2.5 GPa is thus obtained in the calculation of E.

Since the glasses according to the invention have a combination of the constituent phases indicated above, it is expedient for the calculation of the number of distance, angle and 3D angle conditions per atom to initially indicate these numerically for each constituent phase.

The following numerical values have initially been calculated according to the method indicated in DE 10 2014 119 594 A1, wherein here the number of angle conditions has been calculated for all cations and indeed as in DE 10 2014 119 594 A1 (but there only for boron and aluminium); moreover, the degree of ionisation of a cation-oxygen compound could not have been calculated according to the formula (8) from DE 10 2014 119 594 A1, but rather according to the formula (3) from Alberto Garcia, Marvon Cohen, First Principles Ionicity Scales, Phys. Rev. B 1993. The coordination numbers required for this purpose have been taken from the mineralogical literature listed below in the discussion of the constituent phases; according to Conradt R., loc. cit., we assume that the coordination numbers of the cations in the glass are equal to those of the corresponding crystal phases.

The following applies:

TABLE 6

Number of angle conditions etc.

| Constituent phase + formula (standardized to a simple oxide) | Atoms/ building unit | Angle conditions/ Atom $b_{W,i}$ | 3D angle conditions/ Atom $b_{3DW,i}$ |
|---|---|---|---|
| Reedmergnerite ($Na_2O \cdot B_2O_3 \cdot 6SiO_2$)/8 | 3.25 | 1.431196438 | 1.431196438 |
| Potassium reedmergnerite ($K_2O \cdot B_2O_3 \cdot 6SiO_2$)/8 | 3.25 | 1.427878942 | 1.427878942 |
| Albite ($Na_2O \cdot Al_2O_3 \cdot 6SiO_2$)/8 | 3.25 | 1.347768648 | 1.347768648 |
| Cordierite ($2MgO \cdot 2Al_2O_3 \cdot 5SiO_2$)/9 | 3.2222 | 1.239141194 | 1.239141194 |
| Anorthite ($CaO \cdot Al_2O_3 \cdot 2SiO_2$)/4 | 3.25 | 1.174000738 | 1.174000738 |
| Diopside ($MgO \cdot CaO \cdot 2SiO_2$)/4 | 2.5 | 1.100228274 | 1.100228274 |
| Boron oxide $B_2O_3$ | 5 | 1.496075913 | 0 |
| Silicon dioxide $SiO_2$ | 3 | 1.666666667 | 1.666666667 |

The calculation rule for determining angle conditions $b_W$ per atom in the finished glass is therefore:

$$b_W = \frac{\sum_{i=1}^{n} c_i\cdot y_i\cdot b_{W,i}}{\sum_{i=1}^{n} c_i\cdot y_i} \tag{32}$$

wherein $c_i$ is the molar proportion of the $i^{th}$ constituent phase in the glass composition under consideration, $y_i$ the number of atoms per structural unit in the $i^{th}$ constituent phase and $b_{W,i}$ is the number of angle conditions per atom in the $i^{th}$ constituent phase. “n” is the number of constituent phases.

In an analogous manner, the calculation rule for determining 3D angle conditions $b_{3D\text{-}W}$ per atom in the finished glass is:

$$b_{3D-W} = \frac{\sum_{i=1}^{n} c_i\cdot y_i\cdot b_{3D-W,i}}{\sum_{i=1}^{n} c_i\cdot y_i} \tag{33}$$

wherein $b_{3D\text{-}W,i}$ is the number of 3D angle conditions per atom in the $i^{th}$ constituent phase.

In an analogous manner, the calculation rule for determining distance conditions $b_A$ per atom in the finished glass is:

$$b_A = \frac{\sum_{i=1}^{n} c_i \cdot y_i \cdot b_{A,i}}{\sum_{i=1}^{n} c_i \cdot y_i} \tag{34}$$

wherein $b_{A,i}$ is the number of distance conditions per atom in the $i^{th}$ constituent phase.

Working Point

The calculation of working point VA is firstly necessary to calculate annealing point $T_G$.

Working point VA, at which the viscosity is $10^4$ dPa·s, can be calculated in a similar manner to thermal expansion via the average bond strength. It is known from the literature that the melting point e.g. for metals is reversely proportional to the bond energy (or to the "depth of the interatomic potential wells"), see e.g. H. Foll, Skript zur Vorlesung "Einführung in die Materialwissenschaft I", Christian Albrechts-Universitat Kiel, pp. 79-83; the melting point is identified here cum grano salis with the working temperature.

One therefore takes the approach $VA=a\cdot\overline{E_{pot}}+b$. Evaluation of a series of different silicate glasses of different types (soda-lime glasses, borosilicate glasses, aluminosilicate glasses) leads to the following formula:

$$VA = 0.989573825 \cdot \overline{E_{pot}} \cdot \frac{°\text{C}}{\text{kJ/mol}} - 387.9923613\ °\text{C} \tag{35}$$

A mean error of 28K is thus obtained in the calculation of VA.

Difference Between Working Point and Annealing Point, Annealing Point

In terms of the above-mentioned meaning of the "shortness" or "length" of a glass, i.e. a steep or flat profile of the viscosity curve above the annealing point, the difference between working point VA and annealing point $T_G$, in the case of which the viscosity is $10^{13}$ dPa·s, is particularly important.

It has surprisingly become apparent that there is a relationship between this difference on one hand and the number of degrees of angle freedom on the other hand. This enables a direct statement about $VA-T_G$ as well as an indirect determination of the annealing point via the relationship $T_G=VA-(VA-T_G)$.

The starting point is the following consideration. How far $T_G$ and VA are from one another is a question of the temperature profile of the viscosity in the region of the undercooled melt. This can be described by way of narrow temperature intervals with the thermal activation model from Arrhenius. More complex models are necessary for a description across the entire temperature range. The most widespread is the model of Adam and Gibbs, see G. Adam, J. H. Gibbs, On the Temperature Dependence of Cooperative Relaxation Properties in Glass-Forming Liquids, J. Chem. Phys. 43 (1965) S. 139-145. It combines the thermal activation approach of Arrhenius for the movement of an individual atom with a consideration of how many atoms must interact so that a partial movement of the viscous flow is possible. The result is a relationship between viscosity and configuration entropy.

This relation makes it possible to understand why there are "short" and "long" glasses and how this is dependent on the composition. The rule of thumb is: "the higher the number of degrees of configuration freedom, the 'shorter' the glass." The number of degrees of configuration freedom is in turn, as already explained above, dependent on the composition. This number is small in glasses in which primarily covalent bonds are predominant, such as those between silicon and oxygen. In glasses with a large number of ionic bonds such as between sodium and oxygen, the number is high.

A quantitative measure of the "shortness" of glass which has outstanding suitability on the grounds of more in-depth physicochemical considerations is the concept of "Fragility" which goes back to Austen Angell, see Charles Austen Angell, Thermodynamic aspects of the glass transition in liquids and plastic crystals, Pure & Appl. Chem. 63, No. 10 (1991), pp. 1387-1392.

This background suggested testing a relationship between the variable $VA-T_G$ and the number of degrees of configuration freedom. Because actual reconfigurations always include an exploitation of the degrees of angle freedom, we will focus on the latter here. The number of degree of angle freedom per atom $f_W$ is calculated from the number of angle-related constraints as follows, cf. (15).

$$f_W = 5/3 - b_W = 5/3 - \frac{\sum_{i=1}^{n} c_i \cdot y_i \cdot b_{W,i}}{\sum_{i=1}^{n} c_i \cdot y_i} \tag{36}$$

The evaluation of a series of different silicate glasses of different types (soda-lime glasses, borosilicate glasses, aluminosilicate glasses) leads to the following formula:

$$\frac{1}{VA - T_G} = (0.002665819 \cdot f_W + 0.001119212) \cdot \frac{1}{K} \tag{37}$$

$T_G$ can be calculated from VA and $VA-T_G$. A mean error of 22K is thus obtained for $T_G$.

Selection of Suitable Constituent Phases

Reedmergnerite

Production of a product according to the invention should be performed by a targeted exploitation of the varying tendency of the different glass components to evaporate from open hot glass surfaces. This tendency is particularly pronounced in the case of boron and alkalis so alkali borate typically evaporates from open surfaces of hot borosilicate glasses ("hot" means here: in the surroundings of the working point, i.e. the temperature at which the viscosity of the glass is $10^4$ dPa·s), see Johannes Alphonsius Christianus van Limpt, Modeling of evaporation processes in glass melting furnaces, Dissertation, Technische Universiteit Eindhoven, 2007, ISBN: 978-90-386-1147-1.

With a view thereto, reedmergnerite is an essential component of the glasses according to the invention. At high temperatures, i.e. typically at VA, reedmergnerite partially dissociates into sodium borate, which evaporates, and into SiO2, which remains in the melt. At low temperatures, i.e. typically $T_G$, reedmergnerite is present in a non-dissociated form and is made up of $SiO_4$— and $BO_4$ tetrahedrons, i.e. a tectosilicate. The sodium ions which fill the scaffold are coordinated 5 times, see Appleman, D. E., Clark, J. R.: Crystal structure of reedmergnerite, a boron albite, and its relation to feldspar crystal chemistry. Am. J. Sci. 50, 1827-1850 (1965). This is advantageous for the likewise desired high modulus of elasticity.

In terms of the value of the $CTE_{Glass}$ of reedmergnerite glass which is high in comparison with the maximum value of $CTE_{Glass}$ desired here, the proportion of reedmergnerite is at most 50 mol %. A mole of reedmergnerite is understood as a mole of $(Na_2O \cdot B_2O_3 \cdot 6SiO_2)/8$.

The proportion of reedmergnerite in the respective core glass according to the invention optionally lies in a range from 10 to 40 mol %, further optionally of 12 to 36 mol %.

The proportion of reedmergnerite in the core glass according to the invention is 10 to 50 mol %, optionally 11 to 40 mol %, further optionally 12 to 36 mol %, further optionally 13 to 34 mol %, further optionally 14 to 32 mol %, further optionally 15 to 30 mol %, further optionally 16 to 28 mol %, further optionally 17 to 26 mol %. The proportion of reedmergnerite in the core glass according to the invention is at least 10 mol %, optionally at least 11 mol %, further optionally at least 12 mol %, further optionally at least 13 mol %, further optionally at least 14 mol %, further optionally at least 15 mol %, further optionally at least 16 mol %, further optionally at least 17 mol %. The proportion of reedmergnerite in the core glass according to the invention is at most 50 mol %, optionally at most 40 mol %, further optionally at most 36 mol %, further optionally at most 34 mol %, further optionally at most 32 mol %, further optionally at most 30 mol %, further optionally at most 28 mol %, further optionally at most 26 mol %.

In some embodiments, the composition of the upper side surface glass is changed in comparison with the composition of the core glass in particular as a result of the production method such that the composition of the upper side surface glass can no longer be described with the aid of a system according to the invention of constituent phases in particular since negative proportions of one or more phases arise. This is, however, not the case in all embodiments. The invention also includes embodiments in which the composition of the upper side surface glass can be described with the same phase system as the composition of the core glass without negative phase proportions arising for any of the phases.

The proportion of reedmergnerite in such an upper side surface glass according to the invention is, for example, 0 to 20.0 mol %, 0.1 to 15.0 mol %, 0.2 to 10.0 mol %, 0.5 to 9.0 mol %, or 1.0 to 8.0 mol %. The proportion of reedmergnerite in the upper side surface glass according to the invention can be, for example, at least 0.1 mol %, at least 0.2 mol %, at least 0.5 mol %, or at least 1.0 mol %. The proportion of reedmergnerite in the surface glass according to the invention can be, for example, at most 20.0 mol %, at most 15.0 mol %, at most 10.0 mol %, at most 9.0 mol %, or at most 8.0 mol %.

The ratio of the proportion of reedmergnerite in the core glass to the proportion of reedmergnerite in the upper side surface glass optionally lies in a range from 1.4:1 to 150:1, further optionally from 1.5:1 to 100:1, further optionally from 1.6:1 to 75:1, further optionally from 1.7:1 to 50:1, for example, from 2.0:1 to 40:1, from 2.2:1 to 30:1, from 2.4:1 to 20:1, or from 2.5:1 to 10.0:1. The ratio of the proportion of reedmergnerite in the core glass to the proportion of reedmergnerite in the upper side surface glass is optionally at least 1.4:1, further optionally at least 1.5:1, further optionally at least 1.6:1, further optionally at least 1.7:1, for example, at least 2.0:1, at least 2.2:1, at least 2.4:1, or at least 2.5:1. The ratio of the proportion of reedmergnerite in the core glass to the proportion of reedmergnerite in the upper side surface glass is optionally at most 150:1, at most 100:1, at most 75:1, at most 50:1, at most 40:1, at most 30:1, at most 20:1, or at most 10:1. Certain differences in the proportion of reedmergnerite between core glass and upper side surface glass are advantageous since they contribute to a particular degree to the desired CTE differences between core glass and upper side surface glass.

It can, however, be advantageous to limit the differences in the reedmergnerite proportion in order to avoid very large CTE differences.

Silicon Dioxide

In terms of the low desired maximum value of $CTE_{Glass}$, the reedmergnerite glass is expediently combined with pure $SiO_2$ as a further constituent phase. It is furthermore known that a high $SiO_2$ proportion is expedient for high chemical resistance of the glass. For this reason too, a high proportion of $SiO_2$ as the constituent phase is desired.

This proportion is nevertheless limited for various reasons. Firstly, $SiO_2$ does not have the effect described above and required to generate a CTE gradient which reedmergnerite has. $SiO_2$ glass is furthermore constructed from non-stuffed $SiO_4$ tetrahedrons which is disadvantageous for the desired high modulus of elasticity. Finally, too high a proportion of $SiO_2$ as a constituent phase brings about a working point of the glass which is too high from a technical processing perspective.

The proportion of silicon dioxide in the core glass according to the invention is 20 to 75 mol %, for example, 25 to 70 mol %, 30 to 65 mol %, 35 to 62 mol %, or 40 to 60 mol %. The proportion of the constituent phase silicon dioxide in the core glass can be, for example, at least 20 mol %, at least 25 mol %, at least 30 mol %, at least 35 mol %, or at least 40 mol %. The proportion of the constituent phase silicon dioxide in the core glass can be, for example, at most 75 mol %, at most 70 mol %, at most 65 mol %, at most 62 mol %, or at most 60 mol %.

As described above, the invention also includes embodiments in the case of which the composition of the upper side surface glass can be described with the same phase system as the composition of the core glass without negative phase proportions arising for any of the phases.

The proportion of silicon dioxide in such an upper side surface glass is optionally 50 to 90 mol %, for example, 60 to 88 mol %, 70 to 86 mol %, or 72 to 84 mol %. The proportion of the constituent phase silicon dioxide in the upper side surface glass can be, for example, at least 50 mol %, at least 60 mol %, at least 70 mol %, or at least 72 mol %. The proportion of the constituent phase silicon dioxide in the upper side surface glass can be, for example, at most 90 mol %, at most 88 mol %, at most 86 mol %, or at most 84 mol %.

The ratio of the proportion of silicon dioxide in the upper side surface glass to the proportion of silicon dioxide in the core glass optionally lies in a range from 1.1:1 to 2.0:1, further optionally from 1.2:1 to 1.9:1, further optionally from 1.3:1 to 1.8:1, further optionally from 1.4:1 to 1.7:1. The ratio of the proportion of silicon dioxide in the upper side surface glass to the proportion of silicon dioxide in the core glass is optionally at least 1.1:1:1, further optionally at least 1.2:1, further optionally at least 1.3:1, further optionally at least 1.4:1. The ratio of the proportion of silicon dioxide in the upper side surface glass to the proportion of silicon dioxide in the core glass is optionally at most 2.0:1, further optionally at most 1.9:1, further optionally at most 1.8:1, further optionally at most 1.7:1.

Potassium Reedmergnerite

In order to increase devitrification stability, the potassium analogue of the reedmergnerite can still be added to the glass. In the case of such an addition, the finished glass contains not only sodium, but also potassium as alkali and therefore has improved devitrification stability.

The corresponding constituent phase is referred to below as "potassium reedmergnerite" since it can be considered to be a potassium analogue of reedmergnerite with a danburite structure, see Mineralogical Magazine 57 (1993) 157-164

A mole of potassium reedmergnerite is understood as a mol of $(K_2O \cdot B_2O_3 \cdot 6SiO_2)/8$.

The proportion of potassium reedmergnerite in the core glass according to the invention is 0 to 30 mol %, for example, 1.0 to 25.0 mol %, 2.0 to 20.0 mol %, or 2.5 to 15.0 mol %. The proportion of potassium reedmergnerite in the core glass according to the invention can be, for example, at least 1.0 mol %, at least 2.0 mol %, or at least 2.5 mol %. The proportion of potassium reedmergnerite in the core glass can be, for example, at most 30.0 mol %, at most 25.0 mol %, at most 20.0 mol %, or at most 15.0 mol %.

As described above, the invention also includes embodiments in the case of which the composition of the upper side surface glass can be described with the same phase system as the composition of the core glass without negative phase proportions arising for any of the phases.

The proportion of potassium reedmergnerite in such an upper side surface glass is 0 to 20.0 mol %, for example, 0.5 to 15.0 mol %, 1.0 to 12.5 mol %, or 2.0 to 10.0 mol %. The proportion of potassium reedmergnerite in the upper side surface glass can be, for example, at least 0.5 mol %, at least 1.0 mol %, or at least 2.0 mol %. The proportion of potassium reedmergnerite in the upper side surface glass can be, for example, at most 20.0 mol %, at most 15.0 mol %, at most 12.5 mol %, or at most 10.0 mol %.

The ratio of the proportion of potassium reedmergnerite in the core glass to the proportion of potassium reedmergnerite in the upper side surface glass optionally lies in a range from 1.05:1 to 2.00:1, further optionally from 1.10:1 to 1.75:1, further optionally from 1.15:1 to 1.50:1. The ratio of the proportion of potassium reedmergnerite in the core glass to the proportion of potassium reedmergnerite in the upper side surface glass is optionally at least 1.05:1, further optionally at least 1.10:1, further optionally at least 1.15:1. The ratio of the proportion of potassium reedmergnerite in the core glass to the proportion of potassium reedmergnerite in the upper side surface glass is optionally at most 2.00:1, at most 1.75:1, or at most 1.50:1.

Diboron Trioxide

Diboron trioxide as a constituent phase also evaporates such that the presence of B2O3 amplifies the above-mentioned effect. The extent of evaporation can be controlled by the relative air humidity; in the case of the presence of $H_2O$, $B_2O_3$ evaporates in the form of metaboric acid $HBO_2$. Too high a proportion of $B_2O_3$ nevertheless reduces the modulus of elasticity.

The proportion of the constituent phase diboron trioxide in the core glass according to the invention is 0 to 20 mol %, optionally 0 to 15 mol %, further optionally 0 to 10 mol %, further optionally 0.5 to 8 mol %, further optionally 0.8 to 7 mol %, further optionally 1 to 6 mol %, further optionally 1.5 to 5.5 mol %, further optionally 2 to 5 mol %, further optionally 2.5 to 4.5 mol %, further optionally 3 to 4 mol %. The proportion of the constituent phase diboron trioxide in the core glass can be, for example, at least 0.5 mol %, at least 0.8 mol %, at least 1.0 mol %, at least 1.5 mol %, at least 2.0 mol %, at least 2.5 mol %, or at least 3.0 mol %. The proportion of the constituent phase diboron trioxide in the core glass can be, for example, at most 20 mol %, at most 15 mol %, at most 10.0 mol %, at most 8.0 mol %, at most 7.0 mol %, at most 6.0 mol %, at most 5.5 mol %, at most 5.0 mol %, at most 4.5 mol %, or at most 4.0 mol %.

As described above, the invention also includes embodiments in the case of which the composition of the upper side surface glass can be described with the same phase system as the composition of the core glass without negative phase proportions arising for any of the phases.

The proportion of the constituent phase diboron trioxide in such an upper side surface glass is, for example, 0 to 15 mol %, 0 to 10 mol %, 0.5 to 8 mol %, 0.8 to 7 mol %, 1 to 6 mol %, 1.5 to 5.5 mol %, 2 to 5 mol %, 2.5 to 4.5 mol %, or 3 to 4 mol %. The proportion of the constituent phase diboron trioxide in the upper side surface glass can be, for example, at least 0.5 mol %, at least 0.8 mol %, at least 1.0 mol %, at least 1.5 mol %, or at least 2.0 mol %. The proportion of the constituent phase diboron trioxide in the upper side surface glass can be, for example, at most 15 mol %, at most 12.5 mol %, at most 10.0 mol %, at most 9.0 mol %, at most 8.0 mol %, at most 7.0 mol %, at most 6.0 mol %, at most 5.5 mol %, at most 5.0 mol %, at most 4.5 mol %, or at most 4.0 mol %.

The ratio of the proportion of the constituent phase diboron trioxide in the core glass to the proportion of the constituent phase diboron trioxide in the upper side surface glass optionally lies in a range from 1.1:1 to 3.5:1, further optionally from 1.2:1 to 3.0:1, further optionally from 1.4:1 to 2.5:1, further optionally from 1.6:1 to 2.2:1, further optionally from 1.7:1 to 2.0:1. The ratio of the proportion of diboron trioxide in the core glass to the proportion of diboron trioxide in the upper side surface glass is optionally at least 1.1:1, further optionally at least 1.2:1, further optionally at least 1.4:1, for example, at least 1.6:1, or at least 1.7:1. The ratio of the proportion of diboron trioxide in the core glass to the proportion of diboron trioxide in the upper side surface glass is optionally at most 3.5:1, at most 3.0:1, at most 2.5:1, at most 2.2:1, or at most 2.0:1.

Anorthite

Reedmergnerite and its potassium analogue are alkaline. Alkaline glasses have, as stated, a high coefficient of expansion. In order to set the coefficient of expansion to the desired value, $SiO_2$ and $B_2O_3$ can be added but can only be used to a limited extent in terms of the VA and the modulus of elasticity.

A further phase which may be present and the addition of which displaces the coefficient of expansion towards average values, without having the above-mentioned disadvantages of $SiO_2$ and $B_2O_3$, is the alkaline earth metal-aluminosilicate anorthite. A mole of anorthite is understood as a mole of $(CaO \cdot Al_2O_3 \cdot 2SiO_2)/4$.

The advantage of this component in the case of the glasses according to the invention is that aluminium has a very low tendency towards evaporation and (even if a certain degree of calcium depletion of the surface can be observed in the above-mentioned examples) the alkaline earth metals also have a lower tendency to evaporate than the alkalis, see van Limpt, loc. cit., such that the presence of these phases can prevent pure quartz glass from forming as a result of the evaporation on the surface, which is not desirable due to its extreme properties (very high $T_G$, etc.).

The proportion of anorthite in the core glass optionally lies in the case of the glasses according to the invention in a range from 0 to 20 mol %, or 0 to 15 mol %, for example, from 0 to 10.0 mol %, from 0.5 to 9.0 mol %, 1.0 to 8.0 mol %, 1.5 to 7.0 mol %, from 2.0 to 6.0 mol %, from 2.5 to 5.0 mol %, or from 3.0 to 4.5 mol %. The proportion of anorthite in the core glass can be, for example, at least 0.5 mol %, at least 1.0 mol %, at least 1.5 mol %, at least 2.0 mol %, at least 2.5 mol %, or at least 3.0 mol %. The proportion of anorthite in the core glass can be, for example, at most 20 mol %, at most 15 mol %, at most 10.0 mol %, at most 9.0 mol %, at most 8.0 mol %, at most 7.0 mol %, at most 6.0 mol %, at most 5.0 mol %, or at most 4.5 mol %. In some embodiments, the proportion of anorthite in the core glass is at most 0.2 mol % or at most 0.1 mol %, or the core glass is even free from anorthite.

As described above, the invention also includes embodiments in the case of which the composition of the upper side surface glass can be described with the same phase system as the composition of the core glass without negative phase proportions arising for any of the phases.

The proportion of anorthite in such an upper side surface glass can lie, for example, in a range from 0 to 10.0 mol %, in particular in a range from 0 to 7.5 mol %, from 0 to 5.0 mol %, from 0.1 to 4.0 mol %, from 0.2 to 3.0 mol %, from 0.5 to 2.5 mol %, or from 1.0 to 2.0 mol %. The proportion of anorthite in the upper side surface glass can be, for example, at least 0.1 mol %, at least 0.2 mol %, at least 0.5 mol %, or at least 1.0 mol %. The proportion of anorthite in the upper side surface glass can be, for example, at most 10.0 mol %, at most 7.5 mol %, at most 5.0 mol %, at most 4.0 mol %, at most 3.0 mol %, at most 2.5 mol %, or at most 2.0 mol %. In some embodiments, the proportion of anorthite in the upper side surface glass is at most 0.2 mol % or at most 0.1 mol %, or the upper side surface glass is even free from anorthite.

The ratio of the proportion of the constituent phase anorthite in the core glass to the proportion of the constituent phase anorthite in the upper side surface glass optionally lies in a range from 1.1:1 to 10.0:1, further optionally from 1.2:1 to 7.5:1, further optionally from 1.3:1 to 5.0:1, further optionally from 1.4:1 to 4.0:1, further optionally from 1.5:1 to 3.5:1. The ratio of the proportion of anorthite in the core glass to the proportion of anorthite in the upper side surface glass is optionally at least 1.1:1, further optionally at least 1.2:1, further optionally at least 1.3:1, for example, at least 1.4:1, or at least 1.5:1. The ratio of the proportion of anorthite in the core glass to the proportion of anorthite in the upper side surface glass is optionally at most 10.0:1, at most 7.5:1, at most 5.0:1, at most 4.0:1, or at most 3.5:1.

Further Constituent Phases

In addition to the constituent phases described above reedmergnerite, silicon dioxide, potassium reedmergnerite, diboron trioxide and anorthite, the glass optionally has a composition which is characterized by a system of constituent phases which includes further constituent phases, in particular albite or cordierite and diopside according to the optional core glasses already described above.

Albite

In order to suppress a potential tendency towards separation of a pure borosilicate system, albite, the aluminium analogue of the reedmergnerite can be added as a further phase (American Mineralogist, Volume 81, pages 1344-1349, 1996), see issue of separation J. W. Greig, Immiscibility in silicate melts, Am. J. Sci., 5th ser., Vol. 13 (1927), 1-44 and 133-154. The term a mole of albite refers according to the invention a mole of $(Na_2O \cdot Al_2O_3 \cdot 6SiO_2)/8$. Melting capacity can be impaired in the case of high proportions of albite.

One of the optional core glasses has a composition which is characterized by the following constituent phases (listed below): reedmergnerite, potassium reedmergnerite, albite, anorthite, diboron trioxide, silicon dioxide.

The proportion of albite in the core glass can be, for example, 0 to 50 mol %, optionally 0.5 to 45 mol %, further optionally 1 to 40 mol %, further optionally 1.5 to 35 mol %, further optionally 2 to 33 mol %, further optionally 4 to 30 mol %, further optionally 5 to 27 mol %, further optionally 7 to 25 mol %, further optionally 8 to 22 mol %, further optionally 10 to 20 mol %, further optionally 11 to 18 mol %, further optionally 12 to 16 mol %. The proportion of albite in the core glass can be, for example, at least 0.5 mol %, at least 1.0 mol %, at least 1.5 mol %, at least 2.0 mol %, at least 4.0 mol %, at least 5.0 mol %, at least 7.0 mol %, at least 8.0 mol %, at least 10.0 mol %, at least 11.0 mol %, or at least 12.0 mol %. The proportion of albite in the core glass can be, for example, at most 50 mol %, at most 45 mol %, at most 40 mol %, at most 35 mol %, at most 33 mol %, at most 30 mol %, at most 27 mol %, at most 22 mol %, at most 20 mol %, at most 18 mol %, or at most 16 mol %.

As described above, the invention also includes embodiments in the case of which the composition of the upper side surface glass can be described with the same phase system as the composition of the core glass without negative phase proportions arising for any of the phases.

The proportion of albite in such an upper side surface glass can be, for example, 0 to 50 mol %, optionally 0.5 to 45 mol %, further optionally 1 to 40 mol %, further optionally 1.5 to 35 mol %, further optionally 2 to 33 mol %, further optionally 4 to 30 mol %, further optionally 5 to 27 mol %, further optionally 7 to 25 mol %, further optionally 8 to 22 mol %, further optionally 10 to 20 mol %, further optionally 11 to 18 mol %, further optionally 12 to 16 mol %. The proportion of albite in the upper side surface glass can be, for example, at least 0.5 mol %, at least 1.0 mol %, at least 1.5 mol %, at least 2.0 mol %, at least 4.0 mol %, at least 5.0 mol %, at least 7.0 mol %, at least 8.0 mol %, at least 10.0 mol %, at least 11.0 mol %, or at least 12.0 mol %. The proportion of albite in the upper side surface glass can be, for example, at most 50 mol %, at most 45 mol %, at most 40 mol %, at most 35 mol %, at most 33 mol %, at most 30 mol %, at most 27 mol %, at most 22 mol %, at most 20 mol %, at most 18 mol %, or at most 16 mol %.

The ratio of the proportion of the constituent phase albite in the core glass to the proportion of the constituent phase albite in the upper side surface glass optionally lies in a range from 0.5:1 to 2.0:1, further optionally from 0.6:1 to 1.5:1, further optionally from 0.7:1 to 1.3:1. The ratio of the proportion of albite in the core glass to the proportion of albite in the upper side surface glass is optionally at least 0.5:1, further optionally at least 0.6:1, further optionally at least 0.7:1. The ratio of the proportion of albite in the core glass to the proportion of albite in the upper side surface glass is optionally at most 2.0:1, at most 1.5:1, or at most 1.3:1. In some embodiments, the ratio of the proportion of albite in the core glass to the proportion of albite in the upper side surface glass can be more than 1:1, for example, at least 1.1:1 or at least 1.2:1

Cordierite, Diopside

Further phases can, however, also be added, the magnitude of which does not displace the coefficient of expansion towards average values without having the above-mentioned disadvantages of $SiO_2$ and $B_2O_3$. These are the alkaline earth metal-alumino-silicates cordierite and diopside. A mole of cordierite is understood as a mole of $(2MgO \cdot 2Al_2O_3 \cdot 5SiO_2)/9$. A mole of diopside is understood as a mole of $(MgO \cdot CaO \cdot 2SiO_2)/4$.

The advantage of these two components is similar to the advantage of anorthite in particular that the presence of these phases can prevent pure quartz glass from forming as a result of the evaporation on the surface, which is not desirable due to its extreme properties (very high $T_G$, etc.).

One of the optional core glasses has a composition which is characterized by the following constituent phases (listed below): reedmergnerite, potassium reedmergnerite, cordierite, anorthite, diopside, diboron trioxide, silicon dioxide.

The proportion of cordierite in the core glass can be, for example, 0 to 20 mol %, optionally 0 to 15 mol %, further optionally 0 to 10.0 mol %, further optionally 0.5 to 9.0 mol %, further optionally 1.0 to 8.0 mol %, further optionally 1.5 to 7.0 mol %, further optionally 2.0 to 6.0 mol %, further optionally 2.5 to 5.0 mol %, further optionally 3.0 to 4.0 mol %. The proportion of cordierite in the core glass can be, for example, at least 0.5 mol %, at least 1.0 mol %, at least 1.5 mol %, at least 2.0 mol %, at least 2.5 mol %, or at least 3.0 mol %. The proportion of cordierite in the core glass can be, for example, at most 20 mol %, at most 15 mol %, at most 10.0 mol %, at most 9.0 mol %, at most 8.0 mol %, at most 7.0 mol %, at most 6.0 mol %, at most 5.0 mol %, or at most 4.0 mol %.

As described above, the invention also includes embodiments in the case of which the composition of the upper side surface glass can be described with the same phase system as the composition of the core glass without negative phase proportions arising for any of the phases.

The proportion of cordierite in such an upper side surface glass can be, for example, 0 to 20 mol %, optionally 0 to 15 mol %, further optionally 0 to 10.0 mol %, further optionally 0.5 to 9.0 mol %, further optionally 1.0 to 8.0 mol %, further optionally 1.5 to 7.0 mol %, further optionally 2.0 to 6.0 mol %, further optionally 2.5 to 5.0 mol %, further optionally 3.0 to 4.0 mol %. The proportion of cordierite in the upper side surface glass can be, for example, at least 0.5 mol %, at least 1.0 mol %, at least 1.5 mol %, at least 2.0 mol %, at least 2.5 mol %, or at least 3.0 mol %. The proportion of cordierite in the upper side surface glass can be, for example, at most 20 mol %, at most 15 mol %, at most 10.0 mol %, at most 9.0 mol %, at most 8.0 mol %, at most 7.0 mol %, at most 6.0 mol %, at most 5.0 mol %, or at most 4.0 mol %.

The ratio of the proportion of the constituent phase cordierite in the core glass to the proportion of the constituent phase cordierite in the upper side surface glass optionally lies in a range from 0.5:1 to 2.0:1, further optionally from 0.6:1 to 1.5:1, further optionally from 0.7:1 to 1.3:1, for example, 0.8:1 to 1:1. The ratio of the proportion of cordierite in the core glass to the proportion of cordierite in the upper side surface glass is optionally at least 0.5:1, further optionally at least 0.6:1, further optionally at least 0.7:1, for example, at least 0.8:1. The ratio of the proportion of cordierite in the core glass to the proportion of cordierite in the upper side surface glass is optionally at most 2.0:1, at most 1.5:1, or at most 1.3:1, for example, at most 1:1.

The proportion of diopside in the core glass can be, for example, 0 to 20 mol %, or 0 to 17.5 mol %, optionally 0 to 15.0 mol %, further optionally 0.5 to 14.0 mol %, further optionally 1.0 to 13.0 mol %, further optionally 2.0 to 12.0 mol %, further optionally 3.0 to 11.0 mol %, further optionally 5.0 to 10.0 mol %, further optionally 6.0 to 9.0 mol %, further optionally 7.0 to 8.0 mol %. The proportion of diopside in the core glass can be, for example, at least 0.5 mol %, at least 1.0 mol %, at least 2.0 mol %, at least 3.0 mol %, at least 5.0 mol %, at least 6.0 mol %, or at least 7.0 mol %. The proportion of diopside in the core glass can be, for example, at most 20 mol %, at most 15.0 mol %, at most 14.0 mol %, at most 13.0 mol %, at most 12.0 mol %, at most 11.0 mol %, at most 10.0 mol %, at most 9.0 mol %, or at most 8.0 mol %.

As described above, the invention also includes embodiments in the case of which the composition of the upper side surface glass can be described with the same phase system as the composition of the core glass without negative phase proportions arising for any of the phases.

The proportion of diopside in such an upper side surface glass can be, for example, 0 to 10.0 mol %, optionally 0 to 7.5 mol %, further optionally 0 to 5.0 mol %, further optionally 0 to 4.0 mol %, further optionally 0.1 to 3.0 mol %, further optionally 0.2 to 2.0 mol %, further optionally 0.5 to 1.5 mol %, further optionally 0.7 to 1.0 mol %. The proportion of diopside in the upper side surface glass can be, for example, at least 0.1 mol %, at least 0.2 mol %, at least 0.5 mol %, or at least 0.7 mol %. The proportion of diopside in the upper side surface glass can be, for example, at most 10.0 mol %, at most 7.5 mol %, at most 5.0 mol %, at most 4.0 mol %, at most 3.0 mol %, at most 2.0 mol %, at most 1.5 mol %, or at most 1.0 mol %.

The ratio of the proportion of the constituent phase diopside in the core glass to the proportion of the constituent phase diopside in the upper side surface glass optionally lies in a range from 1.1:1 to 50:1, further optionally from 1.5:1 to 25:1, further optionally from 2.0:1 bis 20:1, for example, 5.0:1 to 15:1 or 7.5:1 to 12.5:1. The ratio of the proportion of diopside in the core glass to the proportion of diopside in the upper side surface glass is optionally at least 1.1:1, further optionally at least 1.5:1, further optionally at least 2.0:1, for example, at least 5.0:1 or at least 7.5:1. The ratio of the proportion of diopside in the core glass to the proportion of diopside in the upper side surface glass is optionally at most 50:1, at most 25:1, or at most 20:1, for example, at most 15:1 or at most 12.5:1.

Further Components

In addition to the components already stated, the glass can contain further constituents which are referred to herein as "residue". The proportion of the residue in the glass according to the invention is optionally at most 5 mol-% in order to not disturb the glass properties set by careful selection of suitable base glasses. In optional embodiments, the proportion of residue in the glass is at most 3 mol-%, more optionally at most 2 mol-% or at most 1 mol-% or at most 0.5 mol %. The residue contains in particular oxides which are not contained in the base glasses stated herein. The residue thus in particular does not contain any $SiO_2$, $Al_2O_3$, $B_2O_3$, MgO, CaO, $Na_2O$ or $K_2O$.

If it is stated in this description that the glasses are free from a component or a constituent phase or do not contain a certain component or constituent phase, it is thus meant that this component or constituent phase may in any event be present as a contaminant in the glasses. This means that it is not added in significant quantities. Quantities which are not significant are, according to the invention, quantities of less than 300 ppm (molar), optionally less than 100 ppm (molar), particularly optionally less than 50 ppm (molar) and most optionally less than 10 ppm (molar). The glasses of this invention are in particular free from zinc, barium, zircon, lead, arsenic, antimony, and/or cadmium.

Core glass and/or upper side surface glass are optionally also free from bismuth. The underside surface glass can, in contrast, contain in particular tin oxide and/or bismuth oxide, optionally in a proportion of overall at least 300 ppm (molar), for example, at least 350 ppm (molar), at least 400 ppm (molar), at least 450 ppm (molar), at least 500 ppm (molar), at least 600 ppm (molar), at least 700 ppm (molar), at least 800 ppm (molar), at least 900 ppm (molar), at least 0.1 mol %, at least 0.2 mol %, at least 0.3 mol %, or at least 0.4 mol %. The underside surface glass optionally contains tin oxide and/or bismuth oxide in a proportion of overall at most 2.0 mol %, at most 1.5 mol %, at most 1.0 mol %, at most 0.8 mol %, or at most 0.6 mol %. The total proportion of tin oxide and bismuth oxide in the underside surface glass can be, for example, in a range from 300 ppm (molar) to 2.0 mol %, from 350 ppm (molar) to 2.0 mol %, from 400 ppm (molar) to 2.0 mol %, from 450 ppm (molar) to 1.5 mol %, from 500 ppm (molar) to 1.5 mol %, from 600 ppm (molar) to 1.0 mol %, from 700 ppm (molar) to 1.0 mol %, from 800 ppm (molar) to 1.0 mol %, from 900 ppm (molar) to 0.8 mol %, from 0.1 mol % to 0.8 mol %, from 0.2 mol % to 0.6 mol %, from 0.3 mol % to 0.6 mol %, or from 0.4 mol % to 0.6 mol %.

According to the invention, the sum of the proportions of tin oxide and bismuth oxide in the underside surface glass is greater than the sum of the proportions of tin oxide and bismuth oxide in the upper side surface glass. The sum of the proportions of tin oxide and bismuth oxide in the underside surface glass can exceed the sum of the proportions of tin oxide and bismuth oxide in the upper side surface glass, for example, by at least 1 ppm (molar), at least 10 ppm (molar), at least 50 ppm (molar), at least 100 ppm (molar), at least 200 ppm (molar), at least 300 ppm (molar), at least 350 ppm (molar), at least 400 ppm (molar), at least 450 ppm (molar), at least 500 ppm (molar), at least 600 ppm (molar), at least 700 ppm (molar), at least 800 ppm (molar), at least 900 ppm (molar), at least 0.1 mol %, at least 0.2 mol %, at least 0.3 mol %, or at least 0.4 mol %. The sum of the proportions of tin oxide and bismuth oxide in the underside surface glass can exceed the sum of the proportions of tin oxide and bismuth oxide in the upper side surface glass, for example, by at most 2.0 mol %, at most 1.5 mol %, at most 1.0 mol %, at most 0.8 mol %, or at most 0.6 mol %. The sum of the proportions of tin oxide and bismuth oxide in the underside surface glass can be greater than the sum of the proportions of tin oxide and bismuth oxide in the upper side surface glass, for example, by 300 ppm (molar) to 2.0 mol %, 350 ppm (molar) to 2.0 mol %, 400 ppm (molar) to 2.0 mol %, 450 ppm (molar) to 1.5 mol %, 500 ppm (molar) to 1.5 mol %, 600 ppm (molar) to 1.0 mol %, 700 ppm (molar) to 1.0 mol %, 800 ppm (molar) to 1.0 mol %, 900 ppm (molar) to 0.8 mol %, 0.1 mol % to 0.8 mol %, 0.2 mol % to 0.6 mol %, 0.3 mol % to 0.6 mol %, or 0.4 mol % to 0.6 mol %. In some embodiments, the sum of the proportions of tin oxide and bismuth oxide in the underside surface glass can be greater than the sum of the proportions of tin oxide and bismuth oxide in the upper side surface glass by at least 50 ppm (molar), at least 100 ppm (molar), at least 150 ppm (molar), at least 200 ppm (molar), or at least 250 ppm (molar), for example, by 50 ppm (molar) to 2.0 mol %, by 100 ppm (molar) to 1.5 mol %, by 150 ppm (molar) to 1.0 mol %, by 200 ppm (molar) to 0.8 mol %, or by 250 ppm (molar) to 0.6 mol %.

The term "tin oxide" serves here as a collective term for the various oxides of tin, in particular, for $SnO$, $SnO_2$ and $Sn_2O_3$. The proportion of tin oxide describes in particular the sum of the proportions of $SnO$, $SnO_2$ and $Sn_2O_3$. The term "bismuth oxide" equally serves here as a collective term for the various oxides of bismuth, in particular for $Bi_2O_3$ and $Bi_2O5$. The proportion of bismuth oxide describes in particular the sum of the proportions of $Bi_2O_3$ and $Bi_2O_5$.

All of the formulae for calculating the properties are configured such that the value is calculated which belongs to a glass consisting 100% of the constituent phases. It is therefore not important for the calculations of the properties from the phase composition whether a residue is present or not. The formulae are configured such that the same result is obtained with residue and without residue. In the case of greater residues, the calculations become correspondingly less precise.

Production

The present invention also relates to a method for producing a glass article according to the invention with the steps

- melting the glass raw materials,
- forming a glass article, in particular a flat glass sheet, from the glass melt
- cooling the glass article.

The method optionally includes flat glass forming by way of the float method.

The glass is melted in particular first in a melting tank and "refined" in a bubble-free manner in a refining part. In a channel downstream of the melting tank, the liquid glass can be homogenized, for example, by way of agitators and brought to the viscosity required for forming by adjusting defined glass temperatures (conditioning).

The forming into a flat glass ribbon optionally takes place in the float bath. The conditioned glass melt can flow in particular via a spout lip into the float bath. The float method according to the invention differs significantly in particular in terms of temperature control and dwell times from a standard float method as is described, for example, for the production of soda-lime float glasses.

In the case of a float method, an endless glass ribbon with desired dimensions in terms of width and thickness is produced in that molten glass is added continuously onto the surface of a bath of molten metal. The glass floating on the surface of the metal melt spreads out on this surface. A tin melt is optionally used as the metal melt. The temperatures in and in particular above the tin melt have a hotter and a cooler region, wherein the glass melt is applied in the hot region and raised and removed slowly in the solidified state in the colder region. The float method according to the invention which is particularly suitable for borosilicate glasses is operated in particular with a comparatively low throughput of 20-100 t/day (500-1000 t/day is typical for soda-lime float systems).

The desired glass thickness can be adjusted precisely by the throughput, the gross glass ribbon width and the removal speed. The glass ribbon width is adjusted in the forming part of the float bath facing the melting tank, for example, with top roll machines. These draw the glass outwards (for glass thicknesses<7 mm equilibrium thickness) or convey the glass inwards (>7 mm equilibrium thickness). For glass thicknesses>12 mm, graphite barriers are also used which prevent the glass in the float bath from flowing outwards. The exact thickness profile can be controlled via the glass temperatures. The glass temperatures are adjusted in particular with segmented SiC heating elements. Optionally only the surface of the glass ribbon is heated in the float bath. The glass temperatures (ribbon temperatures) are measured, for example, by way of radiation pyrometers in the longitudinal axis of the float bath. The tin temperatures can likewise be recorded by way of thermoelements.

As a result of the heating of the glass surface, in the case of borosilicate glasses, evaporation of glass components (in particular alkaliborates and/or metaboric acid) into the surrounding atmosphere can arise. These evaporation products can be continuously vented out with the forming gas atmosphere (venting out) in order to avoid condensation of these evaporation products in the cold float bath region (EXIT END).

The type and extent of evaporation can be adjusted in particular in a targeted manner via temperature control and/or dwell times at specific temperatures. Evaporation can also be influenced via the composition of the forming gas atmosphere. Evaporation in turn significantly determines the change in the composition of the upper side surface glass from which in turn the CTE difference between upper side surface glass and core glass is produced which itself is required for the desired compressive prestress on the upper side surface.

In order to avoid oxidation of the liquid tin, the float bath is optionally operated under a reducing protective gas atmosphere, optionally a forming gas mixture of $N_2$ and $H_2$. In particular a small overpressure (for example, approximately 0.3 mbar) can be present in the float bath in order to avoid or minimize the penetration of atmospheric oxygen. The oxygen partial pressure ($pO_2$) can be measured continuously at several points in the float bath. If air penetrates into the float bath or $O_2$ escapes from the glass melt into the float bath atmosphere, $O_2$ thus reacts with $H_2$ to form steam.

Production is performed by a targeted exploitation of the varying tendency of the various glass components, in particular of boron and alkalis, to evaporate from open hot glass surfaces. By targeted adjustment of various method parameters, the evaporation can be adjusted to the desired degree. A certain degree of evaporation is advantageous in order to achieve an advantageous compressive prestress on the upper side surface. On the other hand, it can also be advantageous to restrict the evaporation, in particular to reduce the tendency towards fragile properties or chippings which can be associated in certain circumstances with a particularly high degree of evaporation.

The glass temperature (ribbon temperature) optionally lies between VA and VA+0.2(VA−$T_G$) in the portion of the flowing-on glass.

The glass temperature is optionally at least VA in the portion of the flowing-on glass. This is advantageous for the flowing-on properties of the glass. The glass temperature in the portion of the flowing-on glass is further optionally at least VA+10° C., further optionally at least VA+20° C., for example, at least VA+30° C., at least VA+40° C., at least VA+50° C., at least VA+60° C., at least VA+70° C., at least VA+80° C., at least VA+90° C., or at least VA+100° C. Due to the fact that the glass temperature in the portion of the flowing-on glass is selected to be higher than VA, the extent of the desired evaporation can be increased. This refers respectively to the values for VA calculated from the composition of the core glass (also referred to herein as $VA_K$).

The glass temperature in the portion of the flowing-on glass is, however, optionally at most VA+0.2(VA−$T_G$). The glass temperature in the portion of the flowing-on glass is optionally at most VA+140° C., at most VA+130° C., at most VA+120° C., or at most VA+110° C. A restriction of the flowing-on temperature is advantageous in order to reduce evaporation to a desired degree and thus adjust the desired compressive prestress on the upper side surface in a targeted manner. This refers respectively to the values for VA calculated from the composition of the core glass (also referred to herein as $VA_K$).

The glass temperature in the portion of the flowing-on glass can lie in particular in a range from VA+10° C. to VA+140° C., in particular in a range from VA+20° C. to VA+140° C., from VA+30° C. to VA+140° C., from VA+40° C. to VA+130° C., from VA+50° C. to VA+130° C., from VA+60° C. to VA+120° C., from VA+70° C. to VA+120° C., from VA+80° C. to VA+110° C., from VA+90° C. to VA+110° C., or from VA+100° C. to VA+110° C. This refers respectively to the values for VA calculated from the composition of the core glass (also referred to herein as $VA_K$). In order to achieve the desired evaporation rate, a temperature of VA to VA+6.5 mm/d*100° C., optionally VA+6.5 mm/d*2° C. to VA+6.5 mm/d*80° C., optionally VA+6.5 mm/d*5° C. to VA+6.5 mm/d*50° C., optionally VA+6.5 mm/d*8° C. to VA+6.5 mm/d*30° C., optionally VA+6.5 mm/d*10° C. to VA+6.5 mm/d*15° C. is optional, wherein d is the thickness of the (cooled) glass article in mm.

The glass temperature in the EXIT END region of the float bath optionally lies between $T_G$ und $T_G$+0.2(VA−$T_G$). This refers respectively to the values for VA calculated from the composition of the core glass (also referred to herein as $VA_K$) and $T_G$.

Annealing point $T_G$ is calculated according to formula (37) from the composition of the core glass in constituent phases and working point VA is calculated according to formula (35) from the composition of the core glass in constituent phases.

The dwell time which the glass has in the forming region of the float bath (viscosity in the range $10^3$ dPas to $10^8$ dPas), in order to achieve the evaporation in accordance with the present invention, optionally lies in a range from 5 to 60 minutes, for example, from 10 to 50 minutes, from 15 to 40 minutes, or from 20 to 30 minutes.

In particular the evaporation rates of alkali borates from the glass surface in the float bath are dependent on this dwell time and the temperature, substantially on the temperature and the dwell time of the glass in the evaporation zone. The dwell time in the case of a constant glass throughput (pull rate) is determined by the glass thickness to be manufactured.

The evaporation rates can be adjusted in the case of a given dwell time via the glass temperatures. It is also possible to adjust the dwell time in the case of a given thickness by virtue of the fact that the glass throughput is correspondingly adapted.

The dwell time which the glass has in the forming region of the float bath (viscosity in the range $10^3$ dPas to $10^8$ dPas) is optionally at least 5 minutes, at least 10 minutes, at least 15 minutes, or at least 20 minutes. At least 10 minutes, at least 15 minutes, or at least 20 minutes is particularly advantageous in order to further increase the extent of the evaporation. The dwell time which the glass has in the forming region of the float bath (viscosity in the range $10^3$ dPas to $10^8$ dPas) is optionally at most 60 minutes, at most 50 minutes, at most 40 minutes, or at most 30 minutes. This is advantageous to reduce the evaporation to the desired extent.

The evaporation behaviour can optionally be influenced with the aid of one or more further influencing factors:

The glass melt should optionally contain 30-60 mmol, for example, 40 to 50 mmol water per litre glass in a dissolved form. The water content can be determined, for example, optionally in the cooled core glass, in accordance with "David Pearson, A., Pasteur, G. A. & Northover, W. R. Determination of the absorptivity of OH in a sodium borosilicate glass. J Mater Sci 14, 869-872 (1979).". For this purpose, the glass can be melted at least at its surface in the melting tank in an atmosphere which contains gaseous water. The aqueous atmosphere can be generated in particular by burning fossil energy sources or hydrogen with pure oxygen. As a result of this, in particular the degree of the evaporation of boric acid can be optimized. Water can release boric acid from the glass and contribute to its evaporation. The glass melt therefore optionally contains at least 30 mmol or at least 40 mmol water per litre glass. In order to restrict the degree of evaporation, it can be advantageous if the glass melt contains at most 60 mmol or at most 50 mmol water per litre glass in dissolved form.

The degree of evaporation can also be influenced via the forming gas quantity (in particular inflow quantity and venting out quantity). The float bath pressure can advantageously be adjusted between 0.05 and 0.3 mbar, for example, between 0.1 and 0.2 mbar, in particular by variation of the forming gas quantity and venting out. The float bath pressure can be, for example, at least 0.05 mbar or at least 0.1 mbar. The float bath pressure can be, for example, at most 0.3 mbar or at most 0.2 mbar.

It is also advantageous if the hydrogen content in the forming gas atmosphere lies between 2 and 15 vol %, for example, between 5 and 10 vol-%. For example, the hydrogen content in the forming gas atmosphere is at least 2 vol-% or at least 5 vol-%. For example, the hydrogen content in the forming gas atmosphere is at most 15 vol-% or at most 10 vol-%.

A saturation of the atmosphere with the evaporating substances could also limit the degree of evaporation. It is, however, problematic to want to achieve a limiting of the evaporation in this manner. This is because saturation is never achieved since the float bath atmosphere is continuously replaced and thus the evaporation products are also continuously removed.

According to the invention, the process parameters are selected so that the desired product property in terms of surface evaporation is produced. Different glass thicknesses may require different settings. If, for example, in the case of ultra-thin glasses with a glass thickness of 1 mm or less, the optional dwell time for the surface evaporation of at least 5 min is undershot, the float bath throughput (pull rate) can be reduced to correspondingly increase the dwell time.

In turn various dwell times can also be advantageous for various glass thicknesses in terms of the degree of evaporation. A dwell time of 1 to 10 minutes per mm glass thickness is particularly advantageous, in particular from 2 to 8 minutes per mm glass thickness or from 3 to 5 per mm glass thickness. The dwell time is optionally at least 1 minute per mm glass thickness, at least 2 minutes per mm glass thickness, or at least 3 minutes per mm glass thickness. The dwell time is optionally at most 10 minutes per mm glass thickness, at most 8 minutes per mm glass thickness, or at most 5 minutes per mm glass thickness. This refers to the glass thickness of the finished (cooled) glass article and the dwell time which the glass has in the forming region of the float bath (viscosity in the range $10^3$ dPas to $10^8$ dPas).

All of the relevant process parameters for forming can be documented in "Settings". It can thus be ensured that, in addition to the geometric target parameters such as glass thickness, wedge values, warp and waviness, the desired effect especially in terms of evaporation is also achieved.

Uses

The invention also relates to the use of a glass article, in particular in a cooking device, optionally induction cooking device, as a fire door, as a fireplace viewing panel, or as a window.

EXAMPLES

Optional embodiments of the invention and production are described in greater detail below.

The examples listed below have been chemically analysed both as bulk material and on the surface. The surface analysis was performed in this case by TOF-SIMS; in terms of being able to compress at least cracks of a depth 1-10 nm according to the present invention, in each case the average of the measurements close to the surface down to a depth<20 nm is used as the surface value. This also accounts for the unavoidable noise of this method. In each case 3 approximately equidistant individual measurements were performed at approx. 9 nm, approx. 14 nm and approx. 19 nm depth.

The TOF-SIMS signal strengths (for Si, B, Na, etc.) were constant from approx. 250 nm depth. These signal strengths, and indeed precisely those which were obtained from the normal chemical analysis, were assigned a concentration in %. These values were continued towards the surface. The surface concentrations determined in such a manner were subsequently standardized such that their sum was 100%.

Example 1

Example 1 is a borosilicate glass which has been produced as flat glass of thickness 6.5 mm using the float method. The melting tank is heated with oxyfuel and has a tank throughput of 53 t/d. A feeder channel leads from the melting tank to the "spout lip". This channel is covered so that no alkaline borate can evaporate there.

The hot glass flows via the "spout lip' firstly under a gate valve (TWEEL) with a run-in temperature of 1350° C. into the float bath region onto the hot tin surface. This position is referred to as "bay 0"; this designation originates from the separation of the float bath into zones referred to as "bays". In the present example, the number of bays is "8"; each of these zones has a length of 3 m.

The throughput of the float bath is approx. 50 t/d.

In bay 1, the glass melt spreads out under the action of gravity and flows out to a width of approx. 1.50 m. As a result, the glass ribbon further spreads out to the target width 2.8 m.

As high temperatures as possible are advantageous for good evaporation of the alkaline borates from the glass surface. Bay 1 is therefore acted upon with approx. 50-150 KW heating output (top). The glass surface temperature is 1200-1300° C.

The forming to the desired glass ribbon thickness by way of top rolling machines takes place in bay 2-bay 4. Advantageous heating outputs and glass surface temperatures are in the forming zone:

Bay 2: 100-200 KW and 1050-1150° C.

Bay 3: 200-300 KW and 1000-1100° C.

Bay 4: 50-100 KW and 950-1050° C.

Bays 1-4 form the evaporation zone.

In bays 5-8, the glass ribbon is only cooled and is lifted up at an EXIT temperature of 650-700° C. and transported from the float bath in the lehr. The heating outputs in bays 5-8 are approx. 50-150 KW. Evaporation of alkaline borates no longer takes place in these zones.

The composition has been determined on both sides by TOF-SIMS. The composition values in the core have been equated with the results of a chemical analysis in order to thus standardize the TOF-SIMS measurement values. The following composition in constituent phases (rounded) is produced for the core:

| Constituent phase | mol % (standardized) |
|---|---|
| Reedmergnerite ($Na_2O \cdot B_2O_3 \cdot 6SiO_2$)/8 | 17.8 |
| Potassium reedmergnerite ($K_2O \cdot B_2O_3 \cdot 6SiO_2$)/8 | 3.0 |
| Albite ($Na_2O \cdot Al_2O_3 \cdot 6SiO_2$)/8 | 11.4 |
| Boron oxide $B_2O_3$ | 9.1 |
| Silicon dioxide $SiO_2$ | 58.7 |

The following property values (rounded) are calculated for the core according to the equations (13, 14, 29, 31, 35, 37):

| Property | Core |
|---|---|
| CTE | 3.3 ppm/K |
| E/(1-μ) | 84.7 GPa |
| $T_G$ | 584 °C |
| VA | 1294 °C |

The following property values (rounded) are calculated for the upper side according to the equations (14, 15, 16):

| Property | Upper side |
|---|---|
| CTE | 1.9 ppm/K |

If one uses the values of the core material in (10) for E/(1−μ) and $T_G$ and the difference between the values obtained for core and upper side for ΔCTE, the following arises as a value for the compressive prestress on the upper side:

| | Upper side |
|---|---|
| $\sigma_O$ | 68 MPa |

Example 2

Example 2 is a borosilicate glass which has been produced as flat glass of thickness 6 mm using the float method and the composition of which has been determined on both sides by TOF-SIMS. The composition values in the core have been equated with the results of a chemical analysis in order to thus standardize the TOF-SIMS measurement values. The following composition in constituent phases (rounded) is produced for the core:

| Constituent phase | mol % (standardized) |
|---|---|
| Reedmergnerite ($Na_2O \cdot B_2O_3 \cdot 6SiO_2$)/8 | 25.4 |
| Potassium reedmergnerite ($K_2O \cdot B_2O_3 \cdot 6SiO_2$)/8 | 4.2 |
| Albite ($Na_2O \cdot Al_2O_3 \cdot 6SiO_2$)/8 | 11.6 |
| Anorthite ($CaO \cdot Al_2O_3 \cdot 2SiO_2$)/4 | 4.4 |
| Boron oxide $B_2O_3$ | 5.7 |
| Silicon dioxide $SiO_2$ | 48.7 |

The following property values (rounded) are calculated for the core according to the equations (13, 14, 29, 31, 35, 37):

| Property | Core |
|---|---|
| CTE | 3.8 ppm/K |
| E/(1-μ) | 89.1 GPa |
| $T_G$ | 599 °C |
| VA | 1264 °C |

The following property values (rounded) are calculated for the upper side according to the equations (14, 15, 16):

| Property | Upper side |
|---|---|
| CTE | 1.8 ppm/K |

If one uses the values of the core material in (10) for E/(1−μ) and $T_G$ and the difference between the values obtained for core and upper side for ΔCTE, the following arises as a value for the compressive prestress on the upper side:

| | Upper side |
|---|---|
| $\sigma_O$ | 106 MPa |

Example 3

Example 3 is a borosilicate glass which has been produced as flat glass of thickness 6 mm using the float method and the composition of which has been determined on both sides by TOF-SIMS. The composition values in the core have been equated with the results of a chemical analysis in order to thus standardize the TOF-SIMS measurement values. The following composition in constituent phases (rounded) is produced for the core:

| Constituent phase | mol % (standardized) |
|---|---|
| Reedmergnerite ($Na_2O \cdot B_2O_3 \cdot 6SiO_2$)/8 | 23.0 |
| Potassium reedmergnerite ($K_2O \cdot B_2O_3 \cdot 6SiO_2$)/8 | 12.6 |
| Cordierite ($2MgO \cdot 2Al_2O_3 \cdot 5SiO_2$)/9 | 3.5 |
| Anorthite ($CaO \cdot Al_2O_3 \cdot 2SiO_2$)/4 | 3.1 |
| Diopside ($MgO \cdot CaO \cdot 2SiO_2$)/4 | 7.5 |
| Boron oxide $B_2O_3$ | 4.3 |
| Silicon dioxide $SiO_2$ | 46.0 |

The following property values (rounded) are calculated for the core according to the equations (13, 14, 29, 31, 35, 37):

| Property | Core |
|---|---|
| CTE | 4.0 ppm/K |
| E/(1-μ) | 92.4 GPa |
| $T_G$ | 612 °C |
| VA | 1255 °C |

The following property values (rounded) are calculated for the upper side according to the equations (14, 15, 16):

| Property | Upper side |
|---|---|
| CTE | 2.2 ppm/K |

If one uses the values of the core material in (10) for E/(1−μ) and $T_G$ and the difference between the values obtained for core and upper side for ΔCTE, the following arises as a value for the compressive prestress on the upper side:

| | Upper side |
|---|---|
| $\sigma_O$ | 95.4 MPa |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass article, comprising:

three portions comprising an upper side surface glass, a core glass, and an underside surface glass, the upper side surface glass and the underside surface glass being present in each case to a depth of <20 nm and the core glass is present in any event at 500 nm depth, a sum of proportions of tin oxide and bismuth oxide in the underside surface glass is greater than a sum of proportions of tin oxide and bismuth oxide in the upper side surface glass, the core glass having a $CTE_K$ calculated according to the following general formulas (13) and (14a) in a range from 2.5 to 5.0 ppm/K:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{i=1}^{m} z_{i,j}}, \tag{13}$$

$$CTE_K = \left( \frac{50116.33042\left(\frac{kJ}{\text{Mol}}\right)}{\overline{E_{pot}}} - 26.1724514 \right) \text{ppm/K}, \tag{14a}$$

$$CTE_o = \left( \frac{50116.33042\left(\frac{\text{kJ}}{\text{Mol}}\right)}{\overline{E_{pot}}} - 26.1724514 \right) \text{ppm/K}, \tag{14b}$$

wherein m is a number of cation types which occur, $E_{pot,j}$, is a potential well depth tabulated for a $j^{th}$ cation type, and $z_{j,I}$ is a number of cations of the $j^{th}$ type in $i^{th}$ constituent phase;

the upper side surface glass having a $CTE_O$ that is calculated according to the formula (14b) for the upper side surface glass and the following formulas (15) and (16) which is lower by at least 0.6 ppm/K in comparison with the $CTE_K$ of the core glass calculated according to the formulas (13) and (14a):

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}} = \frac{\sum_{j=1}^{m} \left(\sum_{i=1}^{n} c_i \cdot z_{i,j}\right) \cdot E_{pot,j}}{\sum_{j=1}^{m} \left(\sum_{i=1}^{n} c_i \cdot z_{i,j}\right)}, \tag{15}$$

$$\sum_{i=1}^{n} c_i \cdot z_{i,j} = k_j \cdot x_j; \tag{16}$$

and wherein according to the following formula (10) a compressive prestress $\sigma_O$ on the upper side surface of at least 50 MPa is produced when the values of the core glass calculated according to the following formulas (31), (29), and (37) are used for $E/(1-\mu)$ and $T_G$ and a difference $CTE_K - CTE_O$ between the CTE values calculated for core glass and upper side surface glass is used for $\Delta CTE$:

$$\sigma_O = \frac{E}{1-\mu} \cdot (T_G - T_{ambient}) \cdot \Delta CTE, \tag{10}$$

$$\mu = 0.17 + \Delta\mu_f + \Delta\mu_\chi, \tag{29}$$

$$E = \left(0.683888667\left(2 \cdot (1+\mu) \cdot f \cdot \frac{\overline{E_{pot}} \cdot z}{V_{mol}}\right) - 39.4242404\right) GPa, \tag{31}$$

$$\frac{1}{VA - T_G} = (0.002665819 \cdot f_W + 0.001119212) \cdot \frac{1}{K}, \tag{37}$$

wherein $T_G$ is an annealing point of the glass, VA is a working point of the glass, E is a modulus of elasticity of the glass, μ is Poisson's ratio of the glass, $T_{ambient}$ is an ambient temperature, $$\Delta\mu_f = -\left[\frac{(1+\mu)(1-2\mu)}{3} \frac{1}{f}\right] \Delta f, \text{ and}$$

$$f = \frac{\text{Angle condition number } p.A. - \left(\frac{2}{3}\right)(3D \text{ angle degrees of freedom number } p.A. - \text{angle degrees of freedom number } p.A.)}{\text{Angle condition number } p.A.}.$$

2. The glass article of claim 1, wherein the core glass has a composition which is characterized by a system of constituent phases which comprises the constituent phase reedmergnerite in a proportion of 10 to 50 mol %, the constituent phase potassium reedmergnerite in a proportion of 0 to 30 mol %, the constituent phase anorthite in a proportion of 0 to 20 mol %, the constituent phase diboron trioxide in a proportion of 0 to 20 mol %, and the constituent phase silicon dioxide in a proportion of 20 to 75 mol %.

3. The glass article of claim 2, wherein the composition of the core glass is characterized by the following constituent phases:

| Constituent phase | Min (mol %) | Max (mol %) |
|---|---|---|
| Reedmergnerite | 10 | 50 |
| Potassium reedmergnerite | 0 | 30 |
| Cordierite | 0 | 20 |
| Anorthite | 0 | 20 |
| Diopside | 0 | 20 |
| Diboron trioxide | 0 | 20 |
| Silicon dioxide | 20 | 75. |

4. The glass article of claim 2, wherein the composition of the core glass is characterized by the following constituent phases:

| Constituent phase | Min (mol %) | Max (mol %) |
|---|---|---|
| Reedmergnerite | 10 | 50 |
| Potassium reedmergnerite | 0 | 30 |
| Albite | 0 | 50 |
| Anorthite | 0 | 20 |
| Diboron trioxide | 0 | 20 |
| Silicon dioxide | 20 | 75. |

5. The glass article of claim 2, wherein a ratio of a proportion of the constituent phase silicon dioxide in the upper side surface glass to a proportion of the constituent phase silicon dioxide in the core glass lies in a range from 1.1:1 to 2.0:1.

6. The glass article of claim 2, wherein a proportion of the constituent phase silicon dioxide in the upper side surface glass is at least 50 mol %.

7. The glass article of claim 2, wherein a proportion of the constituent phase anorthite in the upper side surface glass is at most 5 mol %.

8. The glass article of claim 2, wherein a proportion of the constituent phase reedmergnerite in the upper side surface glass is at most 10 mol %.

9. The glass article of claim 2, wherein a working point VA calculated according to the following formula (35) from the composition of the core glass in constituent phases lies in a range from 1200° C. to 1350° C.:

$$VA = 0.989573825 \cdot \overline{E_{pot}} \cdot \frac{°\mathrm{C}}{\mathrm{kJ/mol}} - 387.9923613\ °\mathrm{C}. \tag{35}$$

10. The glass article of claim 2, wherein a quotient of the elastic modulus and the variable (1−μ) calculated according to the formulas (31) and (29) from the composition of the core glass lies in a range from 80 GPa to 100 GPa.

11. The glass article of claim 1, wherein the $CTE_O$ calculated according to the formulas (14b), (15), and (16) of the upper side surface glass is 1.2 to 3.0 ppm/K.

12. The glass article of claim 1, wherein a thickness of the glass article lies in a range from 0.1 mm to 30 mm.

13. A method for producing a glass article, comprising:

melting glass raw materials;

forming a glass article from the glass melt; and cooling the glass article; wherein the glass article comprises three portions comprising an upper side surface glass, a core glass, and an underside surface glass, the upper side surface glass and the underside surface glass being present in each case to a depth of <20 nm and the core glass is present in any event at 500 nm depth, a sum of proportions of tin oxide and bismuth oxide in the underside surface glass is greater than a sum of proportions of tin oxide and bismuth oxide in the upper side surface glass, the core glass having a $CTE_K$ calculated according to the following formulas (13) and (14a) in a range from 2.5 to 5.0 ppm/K:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{i=1}^{m} z_{i,j}}, \tag{13}$$

$$CTE_{Glass} = \left( \frac{50116.33042\left(\frac{kJ}{\mathrm{Mol}}\right)}{\overline{E_{pot}}} - 26.1724514 \right) \mathrm{ppm/K}, \tag{14a}$$

$$CTE_O = \left( \frac{50116.33042\left(\frac{kJ}{Mol}\right)}{\overline{E_{pot}}} - 26.1724514 \right) \mathrm{ppm/K}, \tag{14b}$$

wherein m is a number of cation types which occur, $E_{pot,j}$, is a potential well depth tabulated for a $j^{th}$ cation type, and $z_{j,I}$ is a number of cations of the $j^{th}$ type in an $i^{th}$ constituent phase;

the upper side surface glass having a $CTE_O$ that is calculated according to the formula (14b) for the upper side surface glass and the following formulas (15) and (16) which is lower by at least 0.6 ppm/K in comparison with the $CTE_K$ of the core glass calculated according to the formulas (13) and (14a):

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{i=1}^{m} z_{i,j}} = \frac{\sum_{j=1}^{m}\left(\sum_{i=1}^{n} c_i \cdot z_{i,j}\right) \cdot E_{pot,j}}{\sum_{j=1}^{m}\left(\sum_{i=1}^{n} c_i \cdot z_{i,j}\right)}, \tag{15}$$

$$\sum_{i=1}^{n} c_i \cdot z_{i,j} = k_j \cdot x_j; \tag{16}$$

and wherein according to the following formula (10) a compressive prestress $\sigma_O$ on the upper side surface of at least 50 MPa is produced when the values of the core glass calculated according to the following formulas (31), (29), and (37) are used for E/(1−μ) and $T_G$ and a difference $CTE_K$-$CTE_O$ between the CTE values calculated for core glass and upper side surface glass is used for ΔCTE:

$$\sigma_O = \frac{E}{1-\mu} \cdot (T_G - T_{ambient}) \cdot \Delta CTE, \tag{10}$$

$$\mu = 0.17 + \Delta\mu_f + \Delta\mu_X, \tag{29}$$

$$E = \left(0.683888667\left(2 \cdot (1+\mu) \cdot f \cdot \frac{\overline{E_{pot}} \cdot z}{V_{mol}}\right) - 39.4242404\right) GPa, \tag{31}$$

$$\frac{1}{VA - T_G} = (0.002665819 \cdot f_W + 0.001119212) \cdot \frac{1}{K}, \tag{37}$$

wherein $T_G$ is an annealing point of the glass, VA is a working point of the glass, E is a modulus of elasticity of the glass, μ is Poisson's ratio of the glass, $T_{ambient}$ is an ambient temperature, $$\Delta\mu_f = -\left[\frac{(1+\mu)(1-2\mu)}{3}\frac{1}{f}\right]\Delta f, \text{ and}$$

$$f = \frac{\text{Angle condition number } p.A. - \left(\frac{2}{3}\right)(3D \text{ angle degrees of freedom number } p.A. - \text{angle degrees of freedom number } p.A.)}{\text{Angle condition number } p.A.};$$

wherein the glass melt contains 30 to 60 mmol water per liter glass in a dissolved form.

14. The method of claim 13, wherein the method comprises flat glass forming by a float method in which the glass melt is added onto a surface of a float bath composed of molten metal by flowing onto the surface of the float bath.

15. The method of claim 14, wherein a dwell time which the glass has in a forming region of the float bath at a viscosity in the range $10^3$ dPas to $10^8$ dPas lies in a range from 5 to 60 minutes.

16. The method of claim 15, wherein the dwell time lies in a range from 1 minute to 10 minutes per mm thickness of the glass article.

17. The method of claim 15, wherein a glass temperature in a portion of the flowing-on glass lies in a range from $VA_K$+10° C. to $VA_K$+140° C., wherein $VA_K$ is a working point of the glass calculated from a composition of the glass.

18. The method of claim 15, wherein the float bath is operated in a reducing protective gas atmosphere.

19. The method of claim 18, wherein a float bath pressure lies between 0.05 mbar and 0.3 mbar and/or a hydrogen content in the gas atmosphere lies between 2 vol-% and 15 vol-%.

20. A method for producing a glass article, comprising:

melting glass raw materials;

forming a glass article from the glass melt; and cooling the glass article; wherein the glass article comprises three portions comprising an upper side surface glass, a core glass, and an underside surface glass, the upper side surface glass and the underside surface glass being present in each case to a depth of <20 nm and the core glass is present in any event at 500 nm depth, a sum of proportions of tin oxide and bismuth oxide in the underside surface glass is greater than a sum of proportions of tin oxide and bismuth oxide in the upper side surface glass, the core glass having a $CTE_K$ calculated according to the following formulas (13) and (14a) in a range from 2.5 to 5.0 ppm/K:

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}}, \qquad (13)$$

$$CTE_K = \left( \frac{50116.33042\left(\frac{\text{kJ}}{\text{Mol}}\right)}{\overline{E_{pot}}} - 26.1724514 \right) \text{ppm/K}, \qquad (14a)$$

$$CTE_O = \left( \frac{50116.33042\left(\frac{\text{kJ}}{\text{Mol}}\right)}{\overline{E_{pot}}} - 26.1724514 \right) \text{ppm/K}, \qquad (14b)$$

wherein m is a number of cation types which occur, $E_{pot,j}$, is a potential well depth tabulated for a $j^{th}$ cation type, and $z_{j,I}$ is a number of cations of the $j^{th}$ type in $i^{th}$ constituent phase;

the upper side surface glass having a $CTE_O$ that is calculated according to the formula (14b) for the upper side surface glass and the following formulas (15) and (16) which is lower by at least 0.6 ppm/K in comparison with the $CTE_K$ of the core glass calculated according to the formulas (13) and (14a):

$$\overline{E_{pot}} = \frac{\sum_{i=1}^{n} c_i \cdot \sum_{j=1}^{m} z_{i,j} \cdot E_{pot,j}}{\sum_{i=1}^{n} c_i \cdot \sum_{j=1}^{m} z_{i,j}} = \frac{\sum_{j=1}^{m} \left(\sum_{i=1}^{n} c_i \cdot z_{i,j}\right) E_{pot,j}}{\sum_{j=1}^{m} \left(\sum_{i=1}^{n} c_i \cdot z_{i,j}\right)} j, \qquad (15)$$

$$\sum_{i=1}^{n} c_i \cdot z_{i,j} = k_j \cdot x_j; \qquad (16)$$

and wherein according to the following formula (10) a compressive prestress $\sigma_O$ on the upper side surface of at least 50 MPa is produced when the values of the core glass calculated according to the following formulas (31), (29), and (37) are used for E/(1−μ) and $T_G$ and a difference $CTE_K$–$CTE_O$ between the CTE values calculated for core glass and upper side surface glass is used for ΔCTE:

$$\sigma_O = \frac{E}{1-\mu} \cdot (T_G - T_{ambient}) \cdot \Delta CTE, \qquad (10)$$

$$\mu = 0.17 + \Delta\mu_f + \Delta\mu_\chi, \qquad (29)$$

$$E = \left(0.683888667\left(2 \cdot (1+\mu) \cdot f \cdot \frac{\overline{E_{pot}} \cdot z}{V_{mol}}\right) - 39.4242404\right) GPa, \qquad (31)$$

$$\frac{1}{VA - T_G} = (0.002665819 \cdot f_W + 0.001119212) \cdot \frac{1}{K}, \qquad (37)$$

wherein $T_G$ is an annealing point of the glass, VA is a working point of the glass, E is a modulus of elasticity of the glass, μ is Poisson's ratio of the glass, $T_{ambient}$ is an ambient temperature, $$\Delta\mu_f = -\left[\frac{(1+\mu)(1-2\mu)}{3} \frac{1}{f}\right] \Delta f,$$

and $$\text{Angle condition number } p.A. - \left(\frac{2}{3}\right)$$

$$f = \frac{(3D \text{ angle degrees of freedom number } p.A. - \text{angle degrees of freedom number } p.A.)}{\text{Angle condition number } p.A.};$$

wherein the method comprises flat glass forming by a float method in which the glass melt is added onto a surface of a float bath composed of molten metal by flowing onto the surface of the float bath, wherein a dwell time which the glass has in a forming region of the float bath at a viscosity in the range $10^3$ dPas to $10^8$ dPas lies in a range from 5 to 60 minutes.

* * * * *